(12) United States Patent
Ruelle

(10) Patent No.: US 7,068,266 B1
(45) Date of Patent: Jun. 27, 2006

(54) WINDOWING SYSTEMS

(75) Inventor: Alex Ruelle, Paris Cedex (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 275 days.

(21) Appl. No.: 10/089,218

(22) PCT Filed: Sep. 26, 2000

(86) PCT No.: PCT/IB00/01486

§ 371 (c)(1),
(2), (4) Date: Mar. 26, 2002

(87) PCT Pub. No.: WO01/23995

PCT Pub. Date: Apr. 5, 2001

(30) Foreign Application Priority Data

| Sep. 27, 1999 | (EP) | ................................... 99402353 |
| Nov. 2, 1999 | (EP) | ................................... 99402721 |
| Feb. 3, 2000 | (EP) | ................................... 00300832 |

(51) Int. Cl.
*G06T 15/00* (2006.01)

(52) U.S. Cl. ....................... 345/418; 345/629; 345/630

(58) Field of Classification Search ................ 345/418, 345/629–634
See application file for complete search history.

(56) References Cited

U.S. PATENT DOCUMENTS

| 5,831,615 A | 11/1998 | Drews et al. ................ 345/344 |
| 6,246,407 B1* | 6/2001 | Wilks et al. ................. 345/803 |
| 6,359,631 B1* | 3/2002 | DeLeeuw .................... 345/629 |
| 6,538,660 B1* | 3/2003 | Celi et al. .................... 345/592 |

FOREIGN PATENT DOCUMENTS

| EP | 0 605 945 A1 | 7/1994 |
| EP | 0 670 652 A1 | 9/1995 |
| EP | 0 806 756 A2 | 11/1997 |
| WO | WO 98/09270 | 3/1998 |
| WO | WO 99/17549 | 4/1999 |

\* cited by examiner

*Primary Examiner*—Phu K. Nguyen
(74) *Attorney, Agent, or Firm*—Osha Liang LLP

(57) ABSTRACT

A method of displaying a window on a screen is described, in which the window has a background through which underlying objects are visible. Also described are methods of managing windows when drawing takes place in a window which lies under such a window.

31 Claims, 16 Drawing Sheets

WINDOWING SYSTEMS

The invention relates to apparatus for and methods of displaying a window, drawing in a window and displaying a navigator display, a receiver/decoder, a television system, a computer program product, a computer readable medium and a signal.

The invention has particular application to a windowing system for use with receiver/decoders.

Reference is made to European Patent Applications Nos. 99402353.9, 99402721.7 and 00300832.3, whose content is herein incorporated by reference, and from which Convention priority is claimed.

Windowing systems are used to allow different window contents, for example graphical objects such as text or graphical images, to be displayed simultaneously in different areas, known as windows, on a screen. Windows in conventional windowing systems comprise rectangles in a area of which graphical objects may be drawn for display against an opaque background. Windows generally occupy a selected area of the screen, a size, a background colour and a position of a window normally being defined on opening the window and alterable after opening.

Conventional windowing systems may be inflexible in the way they allow information to be presented on the screen. For example, if two windows overlap, then the foremost window will obscure the overlapped part of the underlying window.

In a first aspect of the present invention there is provided a method of displaying a window on a screen wherein the window has a background through which underlying objects are visible. In one particularly preferred aspect this method is carried out by a receiver/decoder, the receiver/decoder being preferably for use with a television set.

The invention can provide the advantage that information may be presented on a screen with some or all of the benefits of a windowing system, whilst objects underlying the window may be at least partially seen through the window.

The invention stems from the realisation that windows may have a transparent background, provided certain precautions are taken. Such precautions include not drawing behind the window once the window has been drawn, or monitoring drawing behind the window to correct for any effects of the drawing.

The method may further comprise drawing a frame of the window, such that the limits of the window are visible. The size of the window may be independent of the size of the screen, and the window may be resizeable and moveable on the screen.

Preferably, the window forms part of a screen comprising a window display and the method further comprises combining the window display with a video image. The window display may be combined with the video image by blending the two, but may be simply overwritten on the (preferably larger area) video image, both preferably using hardware means, obscuring the video image behind the window display. Partly resulting from the increased compactness offered by transparent windows, this can minimise the intrusion of menus and the like on a video image, which can be particularly advantageous in the context of receiver/decoders.

Preferably, the method further comprises displaying the window on a television screen. The present invention is particularly applicable to television displays, by comparison with blending methods, which are typically lower in contrast.

Preferably, the method further comprises the steps of:
defining the size of the window;
drawing foreground objects in the window; and
arranging the background of the window.

This feature is also provided independently. Hence the invention also provides a method of displaying a window comprising the steps of defining the size of the window, drawing foreground objects in the window, and arranging the background of the window such that objects underlying the background are visible. The background is preferably those parts of the window in which no foreground objects are drawn.

The step of drawing foreground objects may comprise setting foreground pixels to desired values. The foreground objects may comprise any or all of a straight line, curved line, box, circle, triangle and typographical character, and preferably are drawn in at least two draw operations. The foreground objects may comprise interactive controls. Controls may be for example clickable buttons, radio buttons, text boxes, clickable arrows, and so on. This can allow floating panels of arbitrary shape to be created.

The step of arranging the background may comprise leaving at least one pixel value unaltered, or blending at least one pixel value with a pixel value of an underlying image, preferably in a region defining the background. In this way, underlying objects may be visible through the background, by making the background either partially or completely transparent.

In one embodiment, the background is completely transparent, and no background pixel values are drawn. In another embodiment, the background is assigned a transparency factor, and at least one background pixel value is blended with at least one pixel value of an underlying object in dependence on the transparency factor. This can allow images in the background to be visible at the same time as underlying objects. For example, the background may have a logo or watermark which is visible, but through which underlying objects may be seen. The transparency factor may be adjustable, for example by the user or under control of the client of the window. In a further embodiment, different transparency factors are assigned to different parts of the background. For example, some parts of the background may be completely transparent, while other parts may have background pixel values which are blended with pixel values of underlying objects.

Preferably, at least one of the objects underlying the background comprises an element of a web page; the element could for example be text, a hyperlink, or other HTML element. In this way, more flexible shapes can be allowed for a control panel, for example to allow a navigation bar to be displayed more efficiently, giving a bigger view of a web page.

The method may further comprise displaying a further window which has a background through which underlying objects are visible; hence more than one "transparent window" may be provided. To achieve stacked transparent windows, at least a part of the first window may underlie the further window.

A problem which has been identified pursuant to the present invention is that drawing in a window which lies underneath a window with a transparent background may result in corruption of images in the transparent window. For example, foreground objects in a transparent window may be overwritten by the drawing. The method may therefore further comprise monitoring drawing in a further window so that drawing in the further window affecting said window can be corrected.

This feature may also be provided independently, and thus the invention also provides a method of drawing in a window, preferably a window which may lie at least partially under an overlying window having a background through which underlying objects are visible, the method comprising drawing in the window and monitoring the drawing so that drawing affecting an overlying window can be corrected, the method being preferably carried out by a receiver/decoder.

In order to correct drawing in the overlying window, the method may further comprise determining a window which may be affected by the drawing, and sending a signal (for example, an expose event) instructing a client of the window which may be affected to redraw at least part of that window.

The signal may be a Java event; it may also be a message, preferably sent via a function call.

In one embodiment a signal may be sent following each drawing operation. However, it has been discovered pursuant to the present invention that sending signals in this way may lead to a large number of redrawing operations, with the result that a large amount of processing is dedicated to redrawing. According to a preferred embodiment of the invention this problem is overcome by suppressing the sending of a signal for at least one drawing operation. The term "suppressing the sending of a signal", and like terms, as used herein preferably connotes the signal either not being sent or not being received. For example, intercepting and removing a signal in transit between two parties, and not sending the signal in the first place both constitute a suppression of the signal.

The feature may also be provided independently, and thus in another aspect of the invention there is provided a method of drawing in a window, preferably a window which may lie at least partially under a window having a background through which underlying objects are visible, the method comprising providing a first mode in which a signal (for example, an expose event) is sent following each drawing operation instructing a client of a window which may be affected by the drawing to redraw at least part of that window, and providing a second mode in which the sending of a signal is suppressed.

The above aspect of the invention can provide the advantage that relatively simple drawing operations may be carried out in the first mode, in which case the affected windows will be continually updated, whereas more complex multiple drawing operations may be carried out in the second mode, which may reduce the amount of processing associated with redrawing.

The signal may be sent from a window manager. Alternatively, the signal may be sent from a client of a window, preferably sent by the client which carried out the drawing, and preferably sent to a window manager. The method preferably further comprises making information relating to the transparency of the window available to the window manager, and the method may further comprise storing the information as an attribute of the window. By making information relating to the transparency of a window available to the window manager, operations such as redrawing can be performed in a centralized and efficient manner. Moreover, less work can be required in order to add the feature of transparent windows to an application, and the amount of extra coding required in each application to implement transparent windows can be reduced.

The term "attribute of a window" as used herein preferably connotes some form of data associated with a window, the data being understood by the window manager and typically stored in a block of memory maintained by the window manager and containing other window attributes. Preferably, the method further comprises sending the information to the window manager, preferably in a message or via a function call. The sending of a signal may be suppressed in dependence on the information.

The sending of a signal may be suppressed in dependence on the relationship of the windows. For example, it may be known that windows having a certain relationship to an active window which is drawn in do not overlap with that window, in which case some processing may be saved by ignoring such windows. For example, windows having the following relationship to the active window could be ignored:

mother, that is, the window from which the active window was opened superiors, that is the mother, its mother etc.

sisters, that is, windows which were opened from the same window as the active window daughters, that is, windows which were opened from the active window inferiors, that is, daughters, their daughters, etc.

Alternatively, all windows could be ignored, or all transparent windows could be ignored.

The method may further comprise sending a signal following a number of drawing operations, the number preferably being determined in advance of at least one drawing operation, and preferably being greater than 1, 3, 5, 10, 30, 50 or 100. This can be more efficient than redrawing after each drawing operation, but can avoid the situation where, if a large number of drawing operations is to be performed at one go, the overlying window is not redrawn for a significant length of time (which can be aesthetically displeasing). The method may further comprise redrawing at least part of the window which may be affected.

In another aspect of the invention there is provided a method of drawing in a windowing system in which drawing in a window is monitored and a signal is sent to at least one other window which may be affected by the drawing, the method further comprising selecting a mode in which a signal to at least one other window is suppressed for at least one drawing operation.

The above method may further comprise selecting a mode in which a signal is sent to said at least one other window, following said at least one drawing operation. The signal may be a signal instructing a client of a window that may be affected by the drawing to redraw at least part of that window.

The present invention also provides a method of displaying a window, comprising providing a window manager which manages the display of the window, and passing information relating to the transparency of the window to the window manager.

Preferably, the window manager forms part of a virtual machine.

The invention further provides a method of displaying a navigator display, preferably for a web browser, wherein the navigator display comprises at least one window having a transparent background.

The transparent background may generally be located outside the foreground. The method may be carried out by a receiver/decoder, the receiver/decoder preferably being for use with a television set.

The invention is applicable to any windowing system, for example for use with a computer. However the invention has particular application with receiver/decoders, and thus the method may be carried out by a receiver/decoder. Receiver/decoders typically have reduced processing power in comparison to personal computers, and thus embodiments of the invention which reduce the processing involved are particularly suited for use with receiver/decoders.

In another aspect of the invention there is provided a method of displaying windows on a screen, comprising:
- displaying first and second windows, at least the first window having a background through which underlying objects are visible;
- determining whether the first window overlaps the second window;
- drawing in the second window; and
- redrawing at least part of the first window if the first window overlaps the second window.

The method may further comprise determining a part of the first window which overlaps the second window, and the step of redrawing may comprise redrawing that part of the first window.

In another aspect of the invention there is provided a method of displaying a transparent window and a determined content of this transparent window on an area of a screen, comprising:
- determining whether the area of the screen is at least partly used to display a portion of another window and another content of the other window corresponding to the portion;
- drawing at least the portion of the other window and the corresponding other content; and
- drawing at least a part of the determined content which overlaps the portion of the other window.

According to a related aspect of the invention, there is provided a receiver/decoder comprising means (typically in the form of a processor) for displaying a window on a screen, wherein the window has a background through which underlying objects are visible, the receiver/decoder preferably being for use with a television set.

The receiver/decoder may further comprise means (typically in the form of a processor) for drawing a frame of the window. The displaying means is preferably adapted to display a window which forms part of a screen comprising a window display, and the receiver/decoder preferably further comprises means for combining the window display with a video image. The displaying means is preferably adapted to display the window on a television screen.

The receiver/decoder may further comprise:
- means (typically in the form of a processor) for defining the size of the window;
- means (typically in the form of a processor) for drawing foreground objects in the window; and
- means (typically in the form of a processor) for arranging the background of the window.

The invention extends to a receiver/decoder comprising:
- means (typically in the form of a processor) for displaying a window;
- means (typically in the form of a processor) for defining the size of the window;
- means (typically in the form of a processor) for drawing foreground objects in the window; and
- means (typically in the form of a processor) for arranging the background of the window such that objects underlying the background are visible.

The means for drawing foreground objects may be adapted to set foreground pixels to desired values. The foreground objects may comprise any or all of a straight line, curved line, box, circle, triangle and typographical character, and preferably are adapted to be drawn in at least two draw operations. The foreground objects may comprise interactive controls.

The arranging means is preferably adapted to leave at least one pixel value unaltered in a region defining the background. It may be adapted to blend at least one pixel value with a pixel value of an underlying image, in a region defining the background. It may be adapted to leave at least one foreground pixel unaltered.

At least one of the objects underlying the background may comprise an element of a web page.

The receiver/decoder may further comprise means (typically in the form of a processor) for displaying a further window which has a background through which underlying objects are visible. At least a part of the first window may underlie the further window.

The receiver/decoder may further comprise means (typically in the form of a processor) for monitoring drawing in a further window so that drawing in the further window affecting said window can be corrected.

The invention extends to a receiver/decoder, comprising:
- means for drawing in a window; and
- means for monitoring the drawing so that drawing affecting an overlying window can be corrected.

The receiver/decoder may further comprise means for determining a window which may be affected by the drawing, and for sending a signal instructing a client of the window which may be affected to redraw at least part of that window. The signal may be a Java event. It may be sent following each drawing operation.

The receiver/decoder may further comprise means for suppressing the signal for at least one drawing operation.

The invention extends to a receiver/decoder comprising means for drawing in a window, in first and second modes, wherein in the first mode a signal is sent following each drawing operation instructing a client of a window which may be affected by the drawing to redraw at least part of that window, and in the second mode the sending of a signal is suppressed.

The signal may be sent from a window manager. The signal may be sent from a client of a window, and is preferably sent by the client which carried out the drawing, and is preferably sent to a window manager.

The receiver/decoder may further comprise means for making information relating to the transparency of the window available to the window manager. It may further comprise means for storing the information as an attribute of the window. It may further comprise means for sending the information to the window manager, preferably in a message or via a function call.

The sending of a signal may be suppressed in dependence on the information. The sending of a signal may be suppressed in dependence on the relationship of the windows.

The receiver/decoder may further comprise means for sending a signal following a number of drawing operations, the number preferably being determined in advance of at least one drawing operation, and preferably being greater than 1, 3, 5, 10, 30, 50 or 100.

The receiver/decoder may further comprise means for redrawing at least part of the window which may be affected.

In an apparatus aspect of the invention there is provided apparatus for displaying a window comprising means for defining the size of the window, means for drawing foreground objects in the window, and means for arranging the background of the window such that objects underlying the background are visible.

The apparatus may further comprise means for drawing a frame of the window.

The means for drawing foreground objects may comprise means for setting foreground pixels to desired values, and the means for arranging the background may be adapted to leave at least one pixel value unaltered, or to blend at least one pixel value with a pixel value of an underlying image, in a region defining the background.

The apparatus may further comprise means for monitoring drawing in a further window so that drawing in the further window affecting said window can be corrected.

In another apparatus aspect there is provided apparatus for drawing in a window, preferably a window which may lie at least partially under an overlying window having a background through which underlying objects are visible, comprising means for drawing in the window and means for monitoring the drawing so that drawing affecting an overlying window can be corrected.

The apparatus may further comprise means for determining a window which may be affected by the drawing, and means for sending a signal instructing a client of the window which may be affected to redraw at least part of that window.

The apparatus may be adapted to send a signal following each drawing operation, or the apparatus may be adapted to suppress the sending of a signal for at least one drawing operation.

In another apparatus aspect there is provided apparatus for drawing in a window, preferably a window which may lie at least partially under a window having a background through which underlying objects are visible, the apparatus having a first mode in which a signal is sent following each drawing operation instructing a client of a window which may be affected by the drawing to redraw at least part of that window, and a second mode in which the sending of a signal is suppressed.

The apparatus may be adapted to suppress the sending of a signal in dependence on the relationship of the windows. The apparatus may be adapted to send a signal following a number of drawing operations.

The apparatus may further comprise means for redrawing at least part of the window which may be affected.

In another apparatus aspect there is provided apparatus for drawing in a windowing system in which drawing in a window is monitored and a signal is sent to at least one other window which may be affected by the drawing, the apparatus comprising means for selecting a mode in which a signal to at least one other window is suppressed for at least one drawing operation.

The apparatus may further comprise means for selecting a mode in which a signal is sent to said at least one other window, following said at least one drawing operation. The signal may be a signal instructing a client of a window that may be affected by the drawing to redraw at least part of that window.

In a related aspect, the present invention provides apparatus for drawing in a windowing system, comprising:
means (typically in the form of a processor) for drawing in a window;
means (typically in the form of a processor) for monitoring the drawing in the window and for sending a signal to at least one other window which may be affected by the drawing; and
means (typically in the form of a processor) for selecting a mode in which a signal to at least one other window is suppressed for at least one drawing operation.

The apparatus preferably further comprises means for selecting a mode in which a signal is sent to said at least one other window, following said at least one drawing operation. The signal may be a signal instructing a client of a window that may be affected by the drawing to redraw at least part of that window.

The invention further extends to apparatus for displaying a window, comprising:
means (typically in the form of a processor) for displaying the window;
a window manager for managing the display of the window; and
means (typically in the form of a processor) for passing information relating to the transparency of the window to the window manager.

Preferably, the window manager forms part of a virtual machine.

The invention also extends to apparatus for displaying a navigator display, comprising means (typically in the form of a processor) for displaying the navigator display in such a way that the navigator display comprises at least one window having a transparent background.

Any of the above apparatus may be a receiver/decoder, and hence the invention further extends to a receiver/decoder comprising apparatus as aforesaid.

The invention extends to a television system, comprising a receiver/decoder as aforesaid and a television set connectable to the receiver/decoder. It also extends to a television system, comprising a receiver/decoder as aforesaid and a television set connected to the receiver/decoder.

According to the present invention, there is provided in a further aspect a receiver/decoder for displaying windows on a screen, comprising:
means (typically in the form of a processor) for displaying first and second windows, at least the first window having a background through which underlying objects are visible;
means (typically in the form of a processor) for determining whether the first window overlaps the second window;
means (typically in the form of a processor) for drawing in the second window; and
means (typically in the form of a processor) for redrawing at least part of the first window if the first window overlaps the second window.

According to the present invention there is provided in a further aspect a computer program product for use with a receiver/decoder, said computer program product (under the control of the program) comprising code for displaying a window on a screen, wherein the window has a background through which underlying objects are visible, the receiver/decoder preferably being for use with a television set.

The computer program product may be tangibly embodied for example as software stored on a storage medium such as a hard disk or volatile or non-volatile memory, or as a signal.

The computer program product may further comprise code for drawing a frame of the window.

Preferably, the displaying code is adapted to display a window which forms part of a screen comprising a window display, and the product further comprises code for combining the window display with a video image. The displaying code may be adapted to display the window on a television screen.

The computer program product may further comprise:
code for defining the size of the window;
code for drawing foreground objects in the window; and
code for arranging the background of the window.

The invention extends to a computer program product comprising:
code for displaying a window;
code for defining the size of the window;
code for drawing foreground objects in the window; and code for arranging the background of the window such that objects underlying the background are visible.

Preferably, the code for drawing foreground objects is adapted to set foreground pixels to desired values. Preferably, the foreground objects comprise any or all of a straight line, curved line, box, circle, triangle and typographical character, and preferably are adapted to be drawn in at least two draw operations. Preferably, the foreground objects comprise interactive controls.

The arranging code may be adapted to leave at least one pixel value unaltered in a region defining the background. The arranging code may be adapted to blend at least one pixel value with a pixel value of an underlying image, in a region defining the background. The arranging code may be adapted to leave at least one foreground pixel unaltered.

At least one of the objects underlying the background may comprise an element of a web page.

Preferably, the computer program product further comprises code for displaying a further window which has a background through which underlying objects are visible.

At least a part of the first window may underlie the further window.

The computer program product may further comprise code for monitoring drawing in a further window so that drawing in the further window affecting said window can be corrected.

The invention extends to a computer program product, comprising:
   code for drawing in a window; and
   code for monitoring the drawing so that drawing affecting an overlying window can be corrected.

The computer program product may further comprise code for determining a window which may be affected by the drawing, and for sending a signal instructing a client of the window which may be affected to redraw at least part of that window. The signal may be a Java event. The signal may be sent following each drawing operation.

Preferably, the computer program product further comprises code for suppressing the signal for at least one drawing operation.

The invention extends to a computer program product comprising code for drawing in a window, in first and second modes, wherein in the first mode a signal is sent following each drawing operation instructing a client of a window which may be affected by the drawing to redraw at least part of that window, and in the second mode the sending of a signal is suppressed.

The signal may be sent from a window manager. The signal may be sent from a client of a window, and is preferably sent by the client which carried out the drawing, and is preferably sent to a window manager.

Preferably, the computer program product further comprises code for making information relating to the transparency of the window available to the window manager.

Preferably, the computer program product further comprises code for storing the information as an attribute of the window.

Preferably the computer program product further comprises code for sending the information to the window manager, preferably in a message or via a function call.

The sending of a signal may be suppressed in dependence on the information. The sending of a signal may be suppressed in dependence on the relationship of the windows.

The computer program product may further comprise code for sending a signal following a number of drawing operations, the number preferably being determined in advance of at least one drawing operation, and preferably being greater than 1, 3, 5, 10, 30, 50 or 100.

The computer program product may further comprise code for redrawing at least part of the window which may be affected.

The invention extends to apparatus for drawing in a windowing system, comprising:
   code for drawing in a window;
   code for monitoring the drawing in the window and for sending a signal to at least one other window which may be affected by the drawing; and
   code for selecting a mode in which a signal to at least one other window is suppressed for at least one drawing operation.

The apparatus may further comprise code for selecting a mode in which a signal is sent to said at least one other window, following said at least one drawing operation. The signal may be a signal instructing a client of a window that may be affected by the drawing to redraw at least part of that window.

The invention extends to apparatus for displaying a window, comprising:
   code for displaying the window;
   a window manager for managing the display of the window; and
   code for passing information relating to the transparency of the window to the window manager.

The window manager may form part of a virtual machine.

The invention further extends to apparatus for displaying a navigator display, comprising code for displaying the navigator display in such a way that the navigator display comprises at least one window having a transparent background.

The invention also extends to a computer program product for displaying windows on a screen, comprising:
   code for displaying first and second windows, at least the first window having a background through which underlying objects are visible;
   code for determining whether the first window overlaps the second window;
   code for drawing in the second window; and
   code for redrawing at least part of the first window if the first window overlaps the second window.

The invention also provides a computer readable medium having stored thereon a program for carrying out any of the methods described above, and a computer program product comprising a program for carrying out any of the methods described above.

The invention further extends to a computer program product comprising a memory and processor, the memory having stored therein an application, and the processor (under the control of the application) being adapted to carry out the method as aforesaid.

The invention also extends to a computer program product comprising a program for carrying out the method as aforesaid.

The invention yet further extends to a computer readable medium having stored thereon a program for carrying out the method as aforesaid.

The invention extends to a computer readable medium having stored thereon a computer program product as aforesaid.

The invention also extends to a signal tangibly embodying a computer program product as aforesaid.

The invention also provides a method and apparatus substantially as described with reference to and as illustrated in the accompanying drawings.

Features of one aspect may be applied to other aspects and method features may be applied in any combination to features relating to any of an apparatus, receiver/decoder, computer program product, or computer readable medium, and vice versa. For example, there may be provided apparatus for displaying a navigator display which performs a method of passing information relating to the transparency of a window to a window manager, and so on.

Preferred features of the present invention will now be described, purely by way of example, with reference to the accompanying drawings, in which:—

Digital Television System

Figure 1:
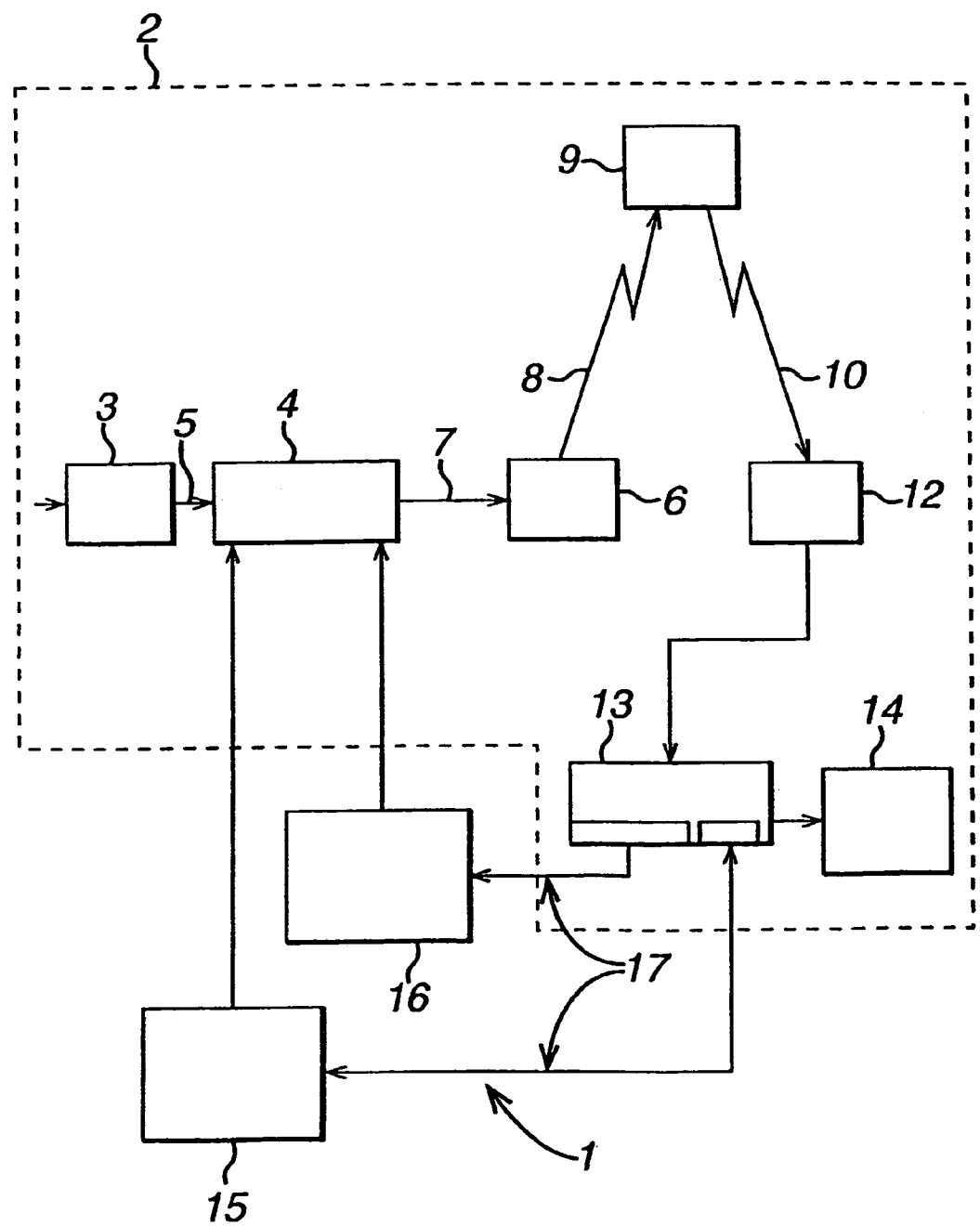
FIG. 1 shows the architecture of a typical digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal strewn (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 13 having access to an equivalent to the exploitation key stored on a smart card inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the receiver/decoder, enables the end user to interact with various applications via a modemmed back channel 17. The modemmed back channel may also be used for communications used in the conditional access system 15.

Receiver/Decoder

Figure 2:
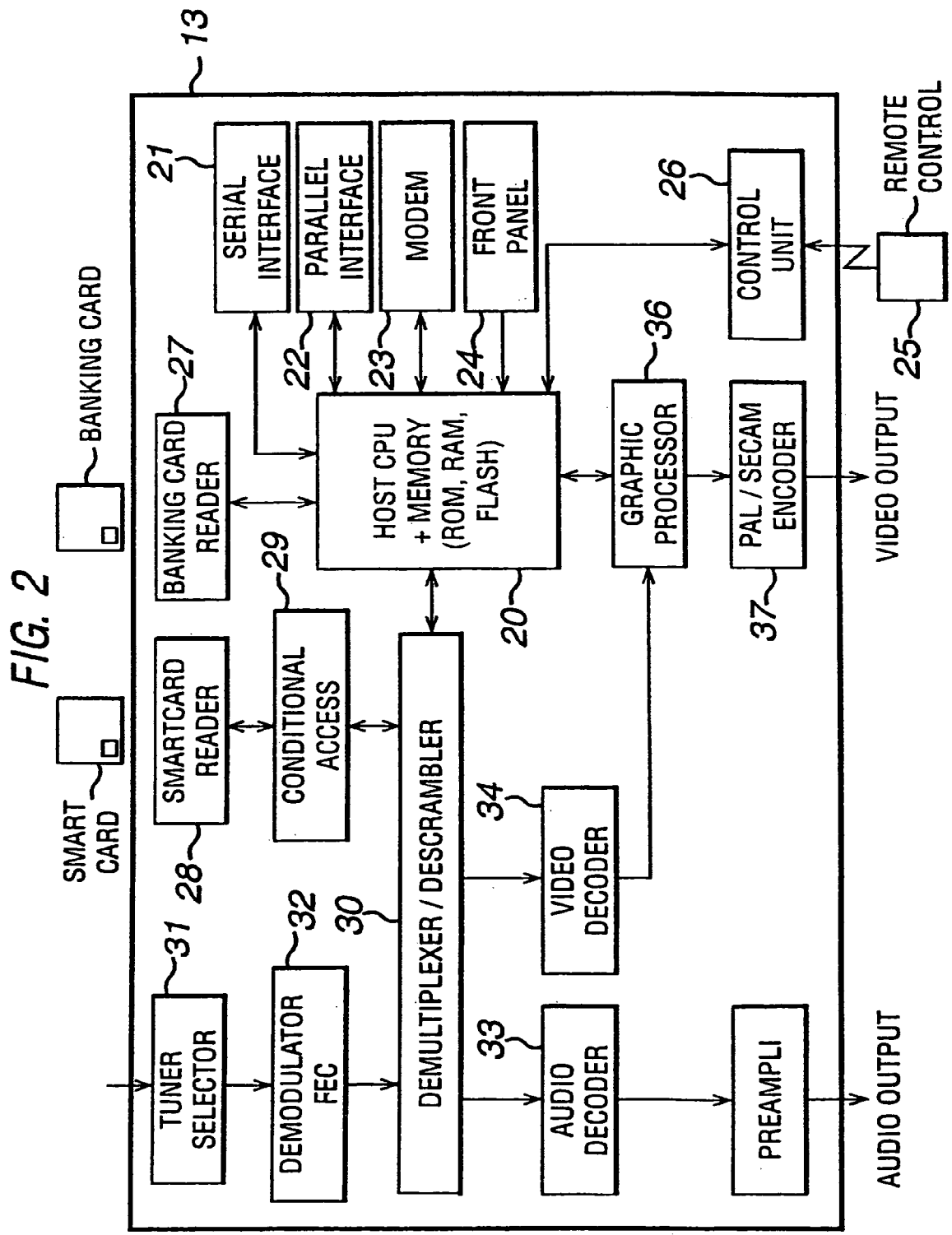
FIG. 2 is a block diagram of a receiver/decoder.

Referring to FIG. 2, the elements of the receiver/decoder 13 or set-top box will now be described. The elements shown in this figure will be described in terms of functional blocks.

The receiver/decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The receiver/decoder is additionally adapted to receive inputs from an infra-red remote control 25 via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

As used in this description, an application is preferably a piece of computer code for controlling high level functions of preferably the receiver/decoder 13. For example, when the end user positions the focus of remote control 25 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Figure 3:
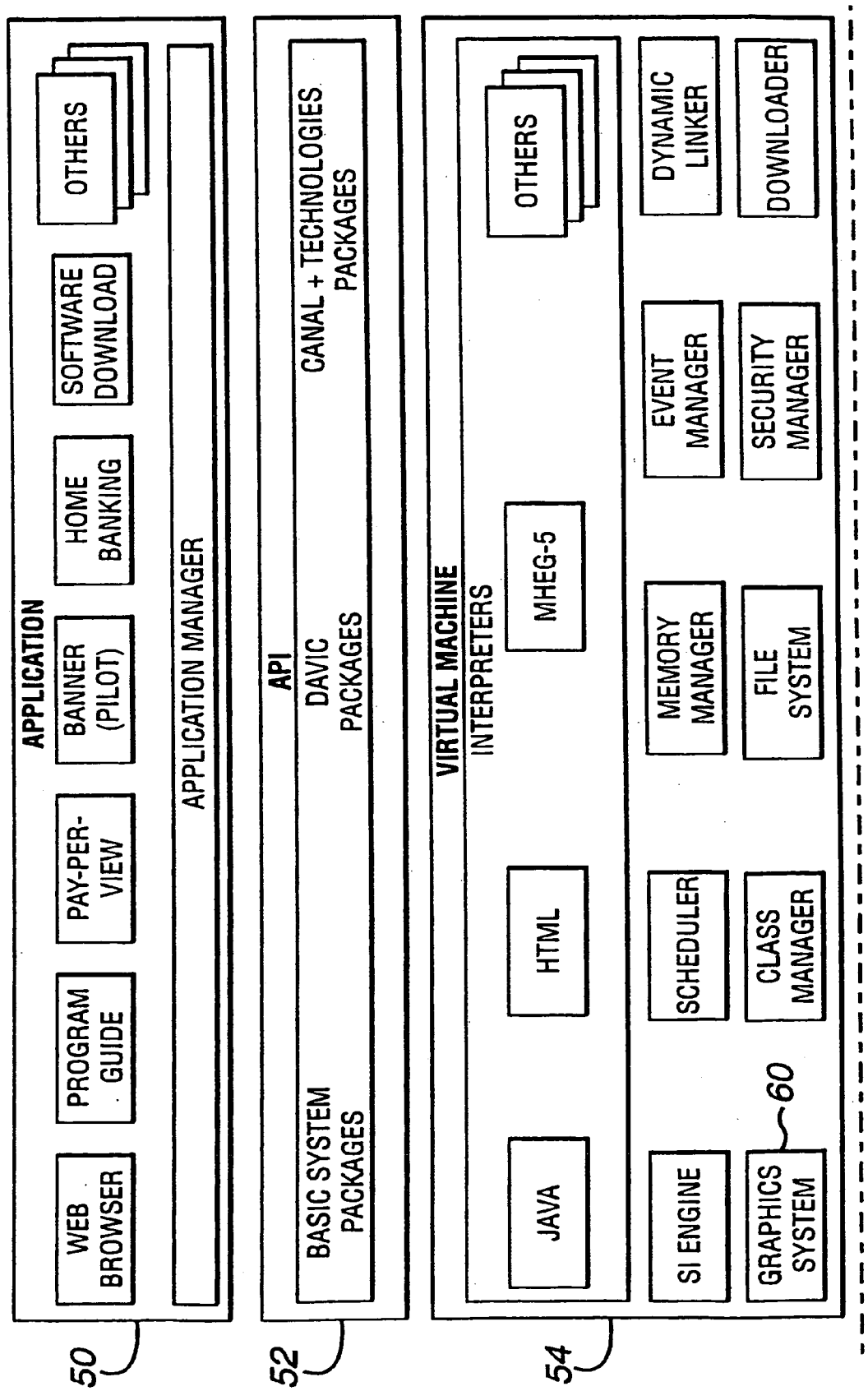
FIG. 3 shows the architecture of a receiver/decoder.
Figure 3:
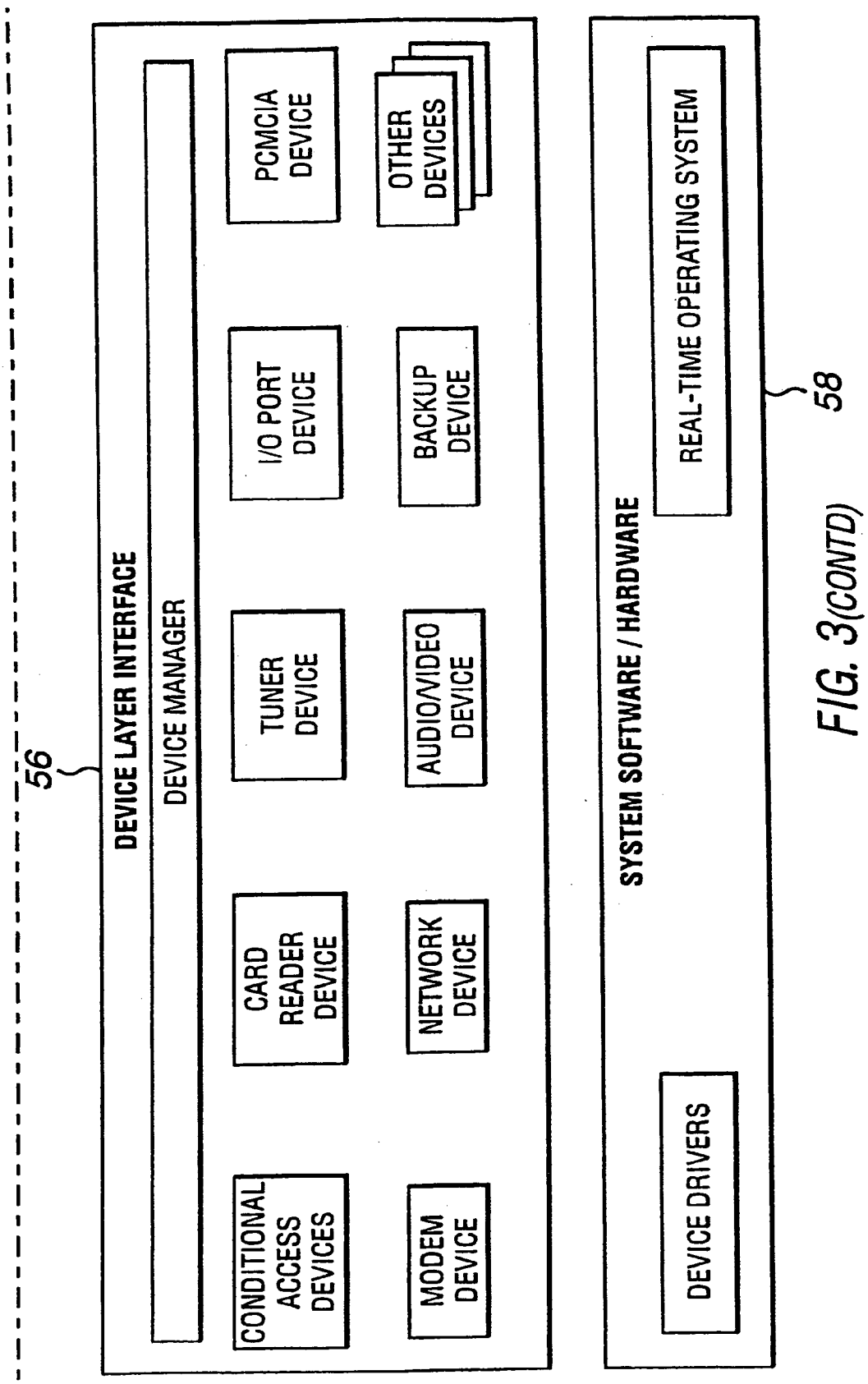

The receiver/decoder contains five software layers, organized so that the software can be implemented in any receiver/decoder and with any operating system. Referring to FIG. 3, the various software layers are Application Layer 50, Application Programming Interface (API) layer 52, Virtual Machine Layer 54, Device Layer Interface 56 and System Software/Hardware Layer 58. The various layers are described below.

Application Layer

The Application Layer 50 encompasses applications that are either resident in or downloaded to the receiver/decoder. They may be interactive applications used by customers, written in, for example, Java, HTML, MHEG-5 or other languages, or they may be applications used by the receiver/decoder to run such applications. This layer is based on a set of open Application Programming Interfaces (APIs) provided by the Virtual Machine layer. This system allows applications to be downloaded to flash or RAM memory in the receiver/decoder on-the-fly or on demand. The application code can be transmitted in compressed or uncompressed format using protocols such as Data Storage Media Command and Control (DSMCC), Network File Server (NFS) or other protocols.

Interactive applications are applications that the user interacts with, for example, to obtain products and services, such as electronic program guides, telebanking applications and games. Various security features are provided for these downloaded applications and data, as follows:

Nothing can be downloaded to the receiver/decoder without first having been authenticated for the intended network, which prevents any unregistered software from being run in the receiver/decoder. This means that any software running in the receiver/decoder is recognized and has been fully tested.

A Security Manager limits access of applications to various memory zones, thus assuring data integrity.

The system can interface with any conditional access system that makes use of secure processors (for example, smart cards inserted in the receiver/decoder).

The following resident applications are used to manage interactive applications:

Boot. The Boot application is the first application launched when the receiver/decoder is powered on. The Boot application starts the different "Managers" in the Virtual Machine, the first being the Application Manager.

Application Manager. The Application Manager manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application is to configure the receiver/decoder, primarily the first time it is used. It performs actions such as scanning for TV channels, setting the date and time, establishing user preferences, and so on. However, the SetUp application can be used at any time by the user to change the Zapping. The Zapping application is used to change channels using the Program-up, Program-down and numeric keys. When another form of zapping is used, for example, through a banner (pilot) application, the Zapping application is stopped.

API Layer

The API layer 52 provides high-level utilities for interactive application development. It includes several packages that make up this high-level API. The packages provide all the functionality necessary to run interactive applications. The packages are accessible by the applications.

In a preferred embodiment the API is adapted to run applications written in the Java programming language. Furthermore, it can interpret HTML and other formats, such as MHEG-5. Besides these interpreters, it also includes other packages and service modules that are detachable and extensible as requirements dictate.

Virtual Machine Layer

The Virtual Machine layer 54 is composed of language interpreters and various modules and systems. It consists of everything necessary to receive and execute interactive applications in the receiver/decoder, including the following:

Language Interpreters. Different interpreters can be installed to conform to the type of applications to be read. These include Java, HTML, MHEG-5 and others.

Service Information (SI) Engine. The SI Engine loads and monitors common Digital Video Broadcasting (DVB) or Program System Information Protocol (PSIP) tables and puts them into a cache. It allows access to these tables by applications which need the data contained in them.

Scheduler. This module allows for pre-emptive, multi-threaded scheduling with each thread having its own event queue.

Memory Manager. This module manages the access to memory. It also automatically compresses data in memory when necessary and performs automatic garbage collection.

Event Manager. This module allows events to be triggered according to priority. It manages timer and event grabbing and allows applications to send events to each other.

Dynamic Linker. This module allows the resolution of addresses arising from native Java functions, loads native methods from a Java class downloaded into RAM and resolves calls from downloaded native codes towards ROM.

Downloader. This module uses automatic data loading from a remote DSMCC carousel or through the NFS protocol, with downloaded files accessed in the same way as resident ones. Memory clear-up, compression and authentication are also provided.

Class Manager. This module loads classes and resolves any class referencing problems.

File System. This module is compact and optimized to manage a hierarchical file system with multiple ROM, flash, RAM and DSMCC volumes. Flash integrity is guaranteed against any incidents.

Security Manager. This module authenticates applications and controls the access of applications to sensitive memory and other zones of the set-top box.

Graphics System. This system is object-orientated and optimized. It includes graphic window and object management as well as a vectorial font engine with multi-language support.

Furthermore, the DAVIC resource notification model is supported so that client resources are efficiently managed.

Device Layer

The Device Layer 56 includes the Device Manager and devices. Devices are software modules which consist of the logical resources necessary for management of external events and physical interfaces. The Device Layer manages communication channels between drivers and applications and provides enhanced error exception checking. Some examples of managed devices are: card readers, modems, network, PCMCIA (Personal Computer Memory Card International Association), LED display and so on.

Programmers do not have to deal with this layer directly, since the API layer controls the devices from above.

System Software/Hardware Layer

The System Software/Hardware layer 58 is provided by the manufacturer of the receiver/decoder. Because of the modularity of the system and because services supplied by the OS (such as event scheduling and memory management) are part of the Virtual Machine, the higher layers are not tied to a particular real-time operating system (RTOS) or to a particular processor.

Graphic System

Figure 4:
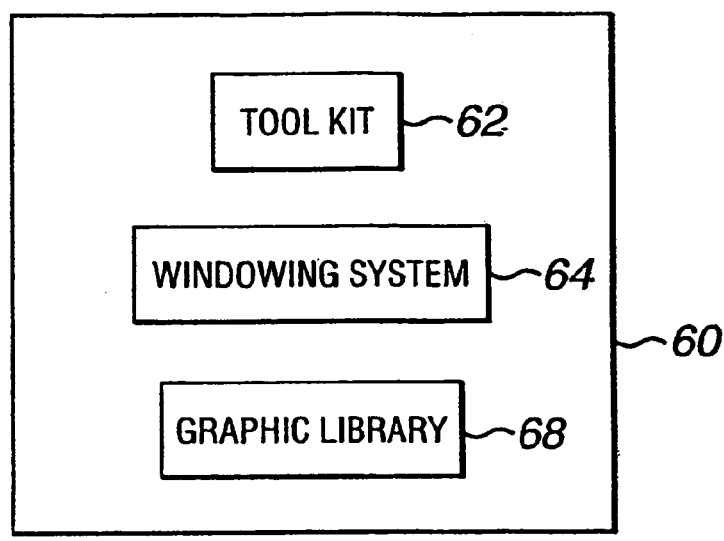
FIG. 4 shows structure of a graphics system.

The Graphic System 60, which is part of the Virtual Machine 54 will now be described. Referring to FIG. 4, the graphic system graphic system comprises widget tool kit 62, which allows graphic objects such as buttons to be drawn, windowing system 64 and graphic library 68. The windowing system 64 manages a multi-window system in which applications may draw and resize windows. The application which draws a window is referred to as the client of that window.

As an example, an application may produce a window having a menu of choices in one area of the screen, while a video image is shown across the whole screen behind the window. In this example, referring to FIG. 2, the menu is produced by CPU 20 while the video comes from video decoder 34. The two are mixed in the graphic processor 26, under control of CPU 20. More complex arrangements are also possible, with multiple windows each having still or moving images within them.

Figure 5:
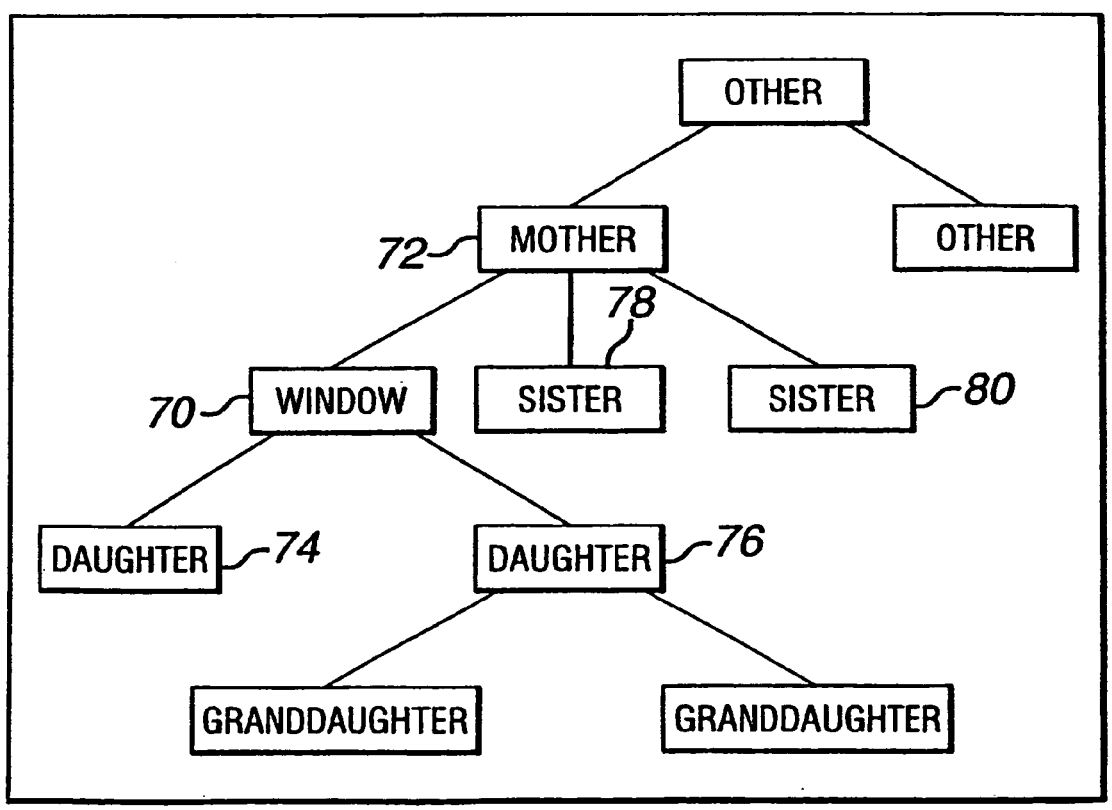
FIG. 5 shows the interrelationship of various windows.

The windowing system maintains a window tree, which defines the relationship between windows. An example of a window tree is shown in FIG. 5. Referring to FIG. 5, the window 72 from which a particular window 70 has been opened is referred to as the mother, windows 74, 76 which were opened from window 70 are referred to as daughters, and windows 78, 80 which were opened from the same mother window 72 are referred to as sisters.

Transparent Windows

In a preferred embodiment, the windowing system manages windows known as transparent windows. A transparent window is a window which does not have a background, that is, through which underlying images can be at least partially seen. The principle of transparent windows will now be described with reference to FIG. 6.

Figure 6A:
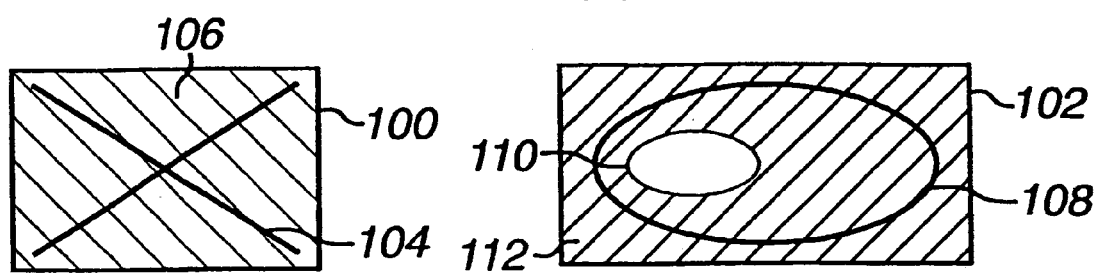
FIG. 6 illustrates the principle of transparent windows.
Figure 6B:
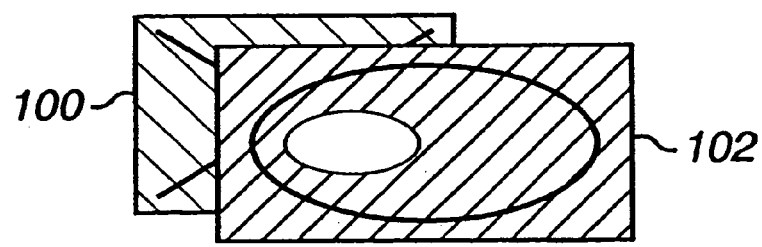
Figure 6C:
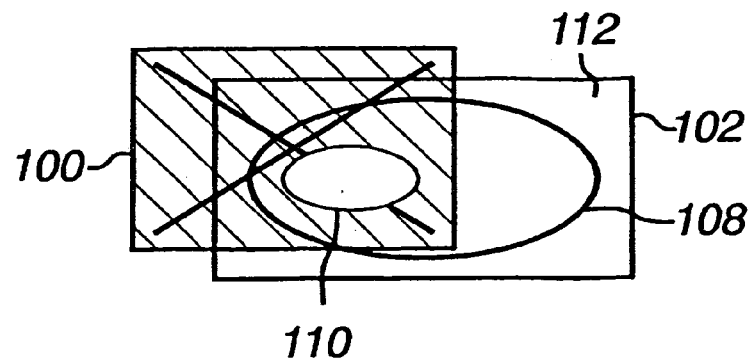

FIG. 6a shows two windows 100, 102 which are not superimposed. Window 100 comprises object 104 and opaque background 106; window 102 comprises two objects 108, 110 and opaque background 112. FIG. 6b shows the situation when the two windows in FIG. 6a are superimposed. In this case, the overlying window completely obscures the underlying window in the area which is common to the two windows. FIG. 6c shows the same situation as in FIG. 6a, but for the case where the overlying window is declared a transparent window. In this case, the two objects 108, 110 are still visible, but the background 112 is now transparent such that window 100 may be seen through it. In the example shown in FIG. 6c, the background 112 is simply not drawn.

Use of transparent windows allows independent designs to be created in different windows, while allowing images in underlying windows to be seen through overlying windows. The present system also allows multiple windows to be displayed, which may consist of a combination of transparent and non-transparent windows.

It should be noted that a transparent window may have a background which is completely transparent, or it may have a background with a certain transparency factor, in which case the background is blended with the underlying objects according to the transparency factor.

Figure 7A:
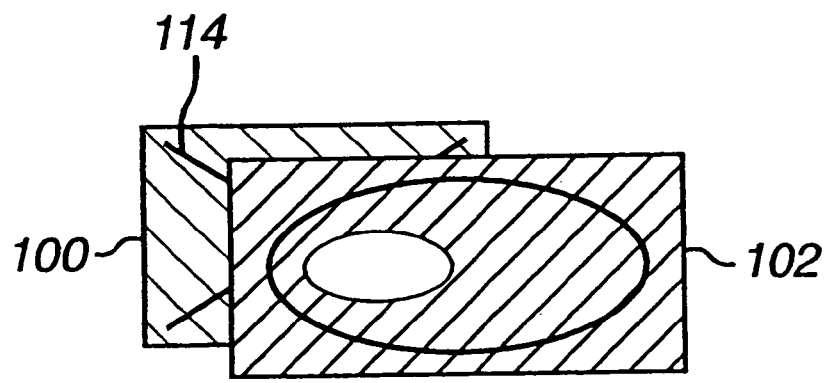
FIG. 7 illustrates the drawing of an object which underlies a window.
Figure 7B:
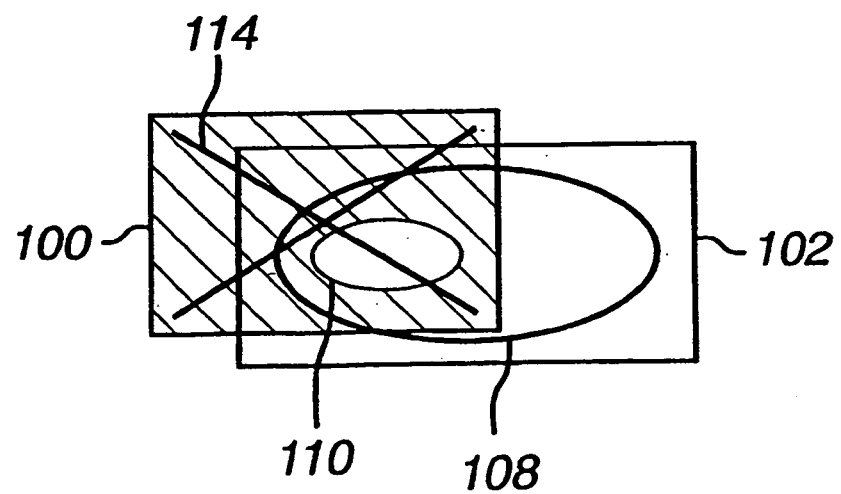

Specific mechanisms are provided to manage transparent windows. These mechanisms handle the situation where drawing takes beneath a transparent window. As will be explained, such drawing may result in corruption of images in the transparent window unless specific action is taken to prevent this. FIG. 7a shows the situation when a line is drawn underneath a window with an opaque background. In this case, when line 114 is drawn, no changes occur in window 102. FIG. 7b shows the situation when window 102 is declared a transparent window. In this case, when line 114 is drawn, it also appears in window 102, with the result that it overwrites the objects 108 and 110 in window 102.

One way of avoiding the overwriting of objects in a transparent window is to prevent drawing from taking place underneath the window. However, in a preferred embodiment, the overwriting of objects in a transparent window is corrected, as described below.

Firstly, the area affectedly the drawing is determined. This is done by monitoring the maximum and minimum coordinates of the drawing while the drawing takes place. The windows system then searches through the window tree to identify any transparent windows which lie over the affected area A so-called Expose Event is then sent to the clients of all such windows. The Expose Event informs the clients that the affected area should be redrawn. A client of a window is responsible for the content of that window, and thus the client is able to redraw an overwritten window. The client redraws that part of the window which coincides with the affected area.

Figure 8A:
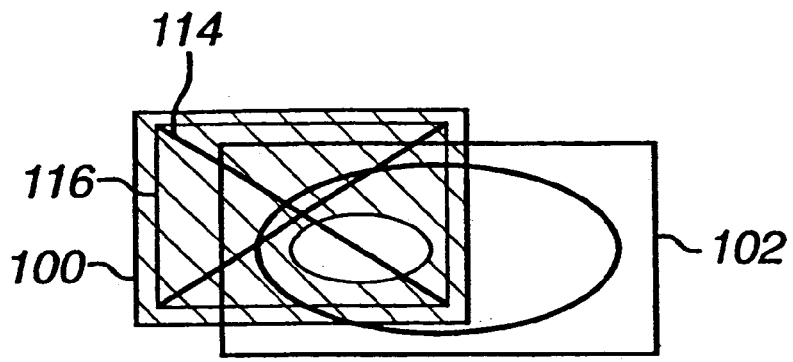
FIG. 8 illustrates the management of redrawing in a transparent windows system.
Figure 8B:
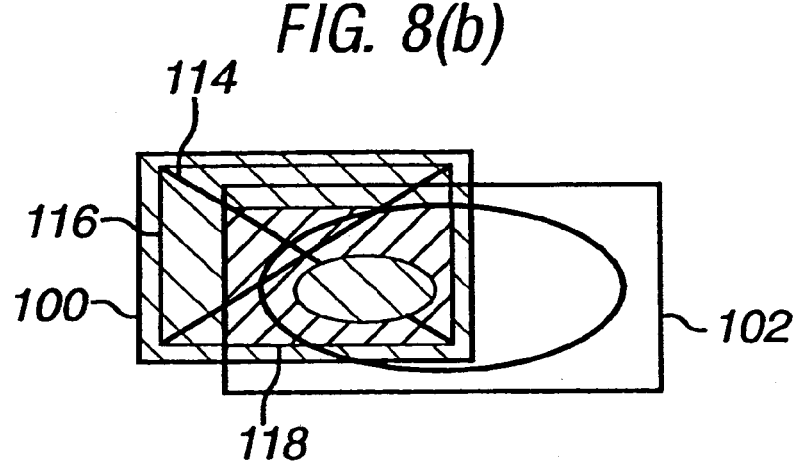
Figure 8C:
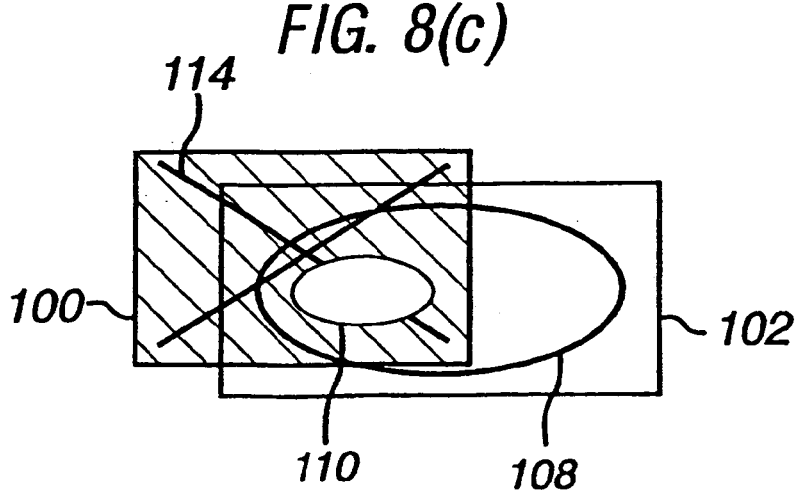

The above sequence of events is illustrated in FIG. 8. Referring to FIG. 8a, the area enclosed by rectangle 116 is the area affected by the drawing of line 114. The windows system then identifies window 102 as a transparent window which lies over affected area 116, and an Expose Event is sent to that window. Referring to FIG. 8b, the part of the window 102 which is affected by the drawing is indicated by rectangle 118. The area within rectangle 118 is then redrawn by the client. As shown in FIG. 8c, the parts of window 102 which were corrupted by the drawing of line 114 are thereby redrawn, so that the objects 108 and 110 are no longer overwritten by line 114.

The above mechanisms allow an application to draw images in a window even if it is overlaid by a transparent window, without corrupting the images in the overlying window.

The number of Expose Events which are sent to the overlying window (that is the number of times that the overlying window is redrawn) is proportional to the number of draw commands which are generated. A draw command is generated each time a single draw operation takes place. To create a complex image, a large number of draw operations may be necessary, each consisting of, for example, the drawing of a straight or curved line, a box, a circle, or some other object. This can result in a large amount of processing being dedicated to redrawing windows, which may reduce the performance of the system. The situation is made worse if multiple windows are open, particularly multiple overlying transparent windows, each of which may require an Expose Event.

In a preferred embodiment of the present invention, the number of Expose Events which are generated, and hence the number of times that an overlying window is redrawn, is reduced by suppressing the generation of Expose Events in certain circumstances. A parameter is provided, referred to herein as win_over_mode, which specifies the situations in which the generation of Expose Events will be suppressed. The parameter win_over_mode allows client applications to define which windows will be taken into account when deciding to which windows an Expose Event will be sent.

In the preferred embodiment, the win_over_mode parameter may define the following situations with regard to Expose Events:

Clip All: normal function in which all windows are taken into account
Ignore Inferiors: daughters and their daughters are ignored
Ignore Sisters: sisters and their daughters are ignored
Ignore Others: all windows which are neither sisters nor daughters are ignored
Ignore No Background: all transparent windows are ignored
Ignore All: all windows are ignored.

Windows which are excluded from the clipping calculation do not receive Expose Events, and thus are not redrawn. For example, it might be known that sister windows never overlie the window in which the drawing takes place. Alternatively, it might be decided to postpone redrawing all transparent windows until the drawing is complete.

Once the drawing is complete, any affected windows may be redrawn. This is done by monitoring the maximum and minimum coordinates of the drawing. When the drawing is complete, the win_over_mode parameter is then set to clip all. A virtual rectangle is then drawn around all affected areas, using the maximum and minimum coordinates of the drawing. By drawing a virtual window, an Expose Event is generated which is sent to all affected windows in the window tree. The windows which have areas coinciding with the affected area are then redrawn, in the way described above.

In summary, greater efficiency can be obtained by deferring the redraw of transparent windows affected by drawing operations performed by an application.

One problem remains, however, as a result of the fact that the windowing system itself may decide to redraw part of a window, for example as a result of the user moving or resizing the window, or moving or resizing an overlapping window. In this case, without further information, the windows system always sends Expose Events to the appropriate windows to ensure a correct result; consequently, more Expose Events are sent, and therefore more time is spent redrawing windows, than if the client was in control of the process.

Figure 9A:
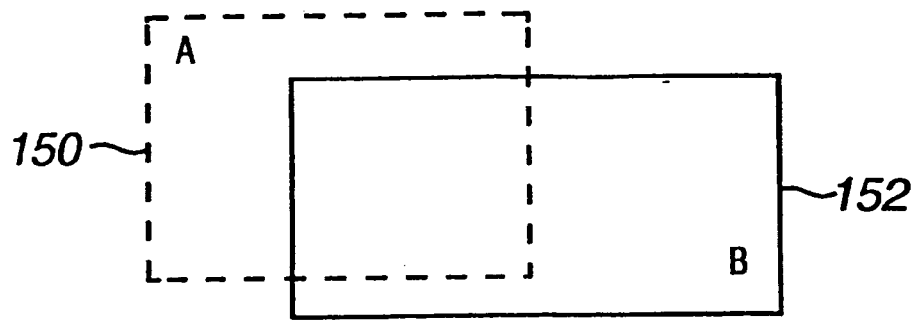
FIG. 9 illustrates different modes of redrawing two overlapping windows.

With reference to FIG. 9, the problem described above and its solution are illustrated. FIG. 9a shows a typical configuration of two windows: a transparent Window A 150 and an opaque Window B 152 which it partially overlaps.

Figure 9B:
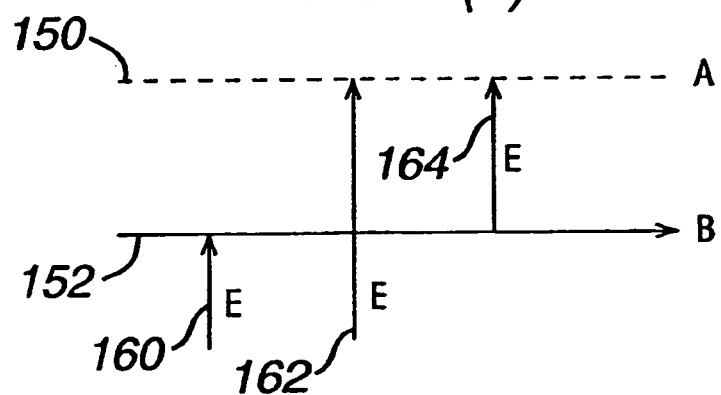

In FIG. 9b, which corresponds to a variant of the preferred embodiment, a typical sequence of Expose Events is illustrated, following a decision by the window manager to redraw part of Window B. Expose Events 160 and 162 are sent to Window B 152 and Window A 150 respectively. Window B, receiving the Expose Event 160, is redrawn, thereby generating a further Expose Event 164, which is sent to Window A. Window A, receiving two Expose Events, is therefore redrawn twice.

Figure 9C:
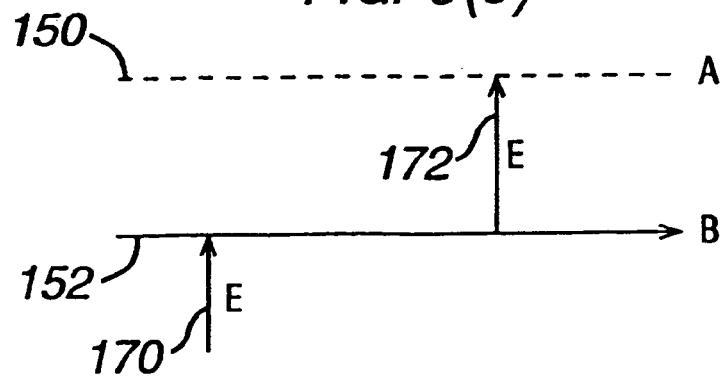

In FIG. 9c, illustrating the preferred embodiment, information regarding the optimisation of Expose Events is made available to the window manager by means of the window attributes of Window A 150. Taking into account this information, a further Expose Event 170 is initially only sent to Window B 152. The subsequent redrawing of Window B then produces the required Expose Event 172, sent to Window A 150 so that it is redrawn only once.

The window attribute which defines the optimisation of the Expose Events in the preferred embodiment has the name of no_bg_win_management (for no background windows management), and takes the values of:

Automatic: each draw operation in the window causes events to be sent to transparent windows.
LetMeDoIt: once the various redraws have finished, the client calls a function (SendEventToNoBgWindow) to specify the extent of the redraws (typically supplying four coordinates specifying the corners of a bounding rectangle); this function determines the zones of the transparent windows to which it must then send Expose Events, thus provoking their redraw in turn. Information regarding the optimisation of Expose Events may of course be made available to the window manager via other means, such as function calls, and so on.

In can be seen from the above that many advantages, such as overall efficiency, ease of use, effective code reuse (due to the transparent windows management code being present once in the window manager instead of several times in different applications), centralized control speed, and so on are afforded by integrating the management of transparent windows into the window manager.

Figure 10:
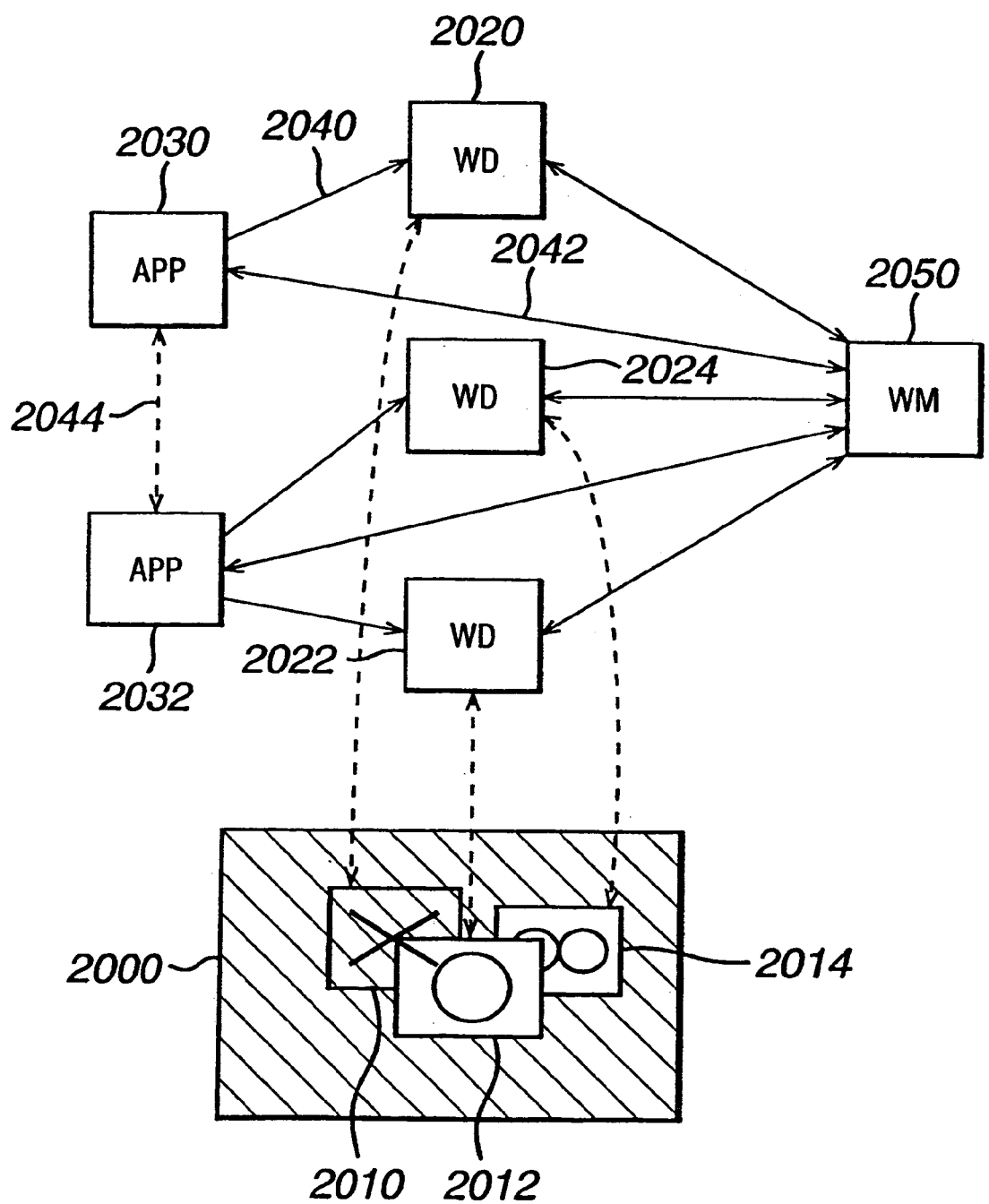
FIG. 10 illustrates the relationship between applications and the window manager.

With reference to FIG. 10, the relationship between the window manager and the clients (applications) of the windows is now described in more detail.

Each window 2010, 2012, 2014 on the screen 2000 has a corresponding window definition data block 2020, 2022, 2024 respectively. Each window is also associated with a particular client (application); in this case, the window 2010 and its corresponding window definition data block 2020 are associated with a first application 2030, and windows 2012, 2014 and their corresponding window definition data blocks 2022, 2024 are associated with the application 2032. A window manager 2050 manages the whole system, and has access to all of the window definition data blocks 2020, 2022, 2024 and can communicate with each application 2030, 2032 by the use of events, messages and/or function calls.

The window definition data blocks contain the various attributes regarding the state of the corresponding window, such as the size, position, border style and modes of behaviour, and including the no_bg_win_management attribute described above, for example. Information regarding the transparency of a window can also be stored in the window definition data block.

In the preferred embodiment, information regarding the transparency of a window 2010 is stored in the window definition data block 2020 by means of a function call 2042 to the window manager 2050. In variants of the preferred embodiment, however, the information is sent to the window manager via other means, or stored directly in the window definition data block 2020, indicated schematically by the link 2040. In addition to being able to communicate with the window manager 2050, applications can communicate directly between each other, indicated schematically by the link 2044.

With reference to FIG. 11, an example in which two overlapping windows are redrawn will now be described, illustrating the above features of the deferred redrawing of overlying transparent windows and the integration of the management of transparent windows into the window manager. In this example, like parts are denoted by like numerals.

Figure 11A:
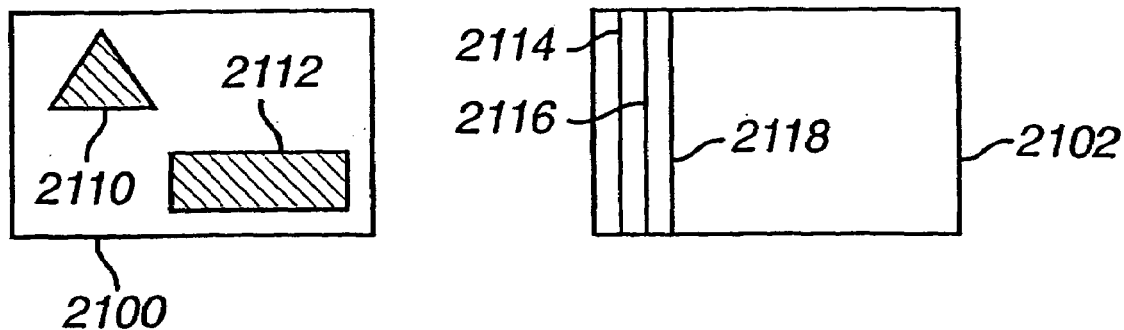
FIG. 11 illustrates a typical sequence of drawing operations during the redrawing of two windows.

The contents of the two windows C 2100 and D 2102 are shown in FIG. 11a. Window C 2100 is transparent, and comprises a triangle 2110 and a rectangle 2112. Window D 2102 is opaque, and comprises three vertical lines 2114, 2116, 2118.

Figure 11B:
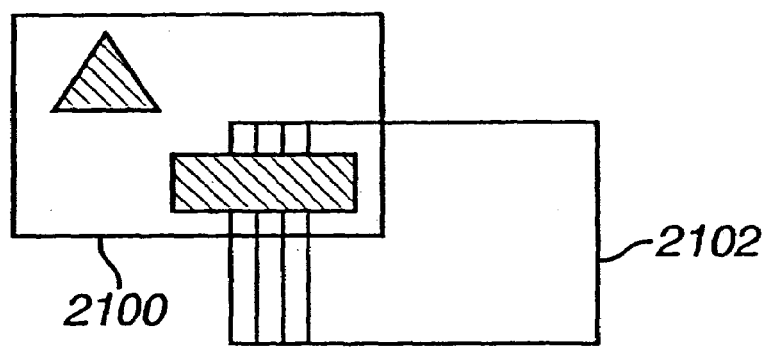

When displayed on screen, with reference to FIG. 11b, the two windows overlap as shown, with Window C 2100 overlying Window D 2102, partially obscuring the contents of Window D.

Figure 11C:
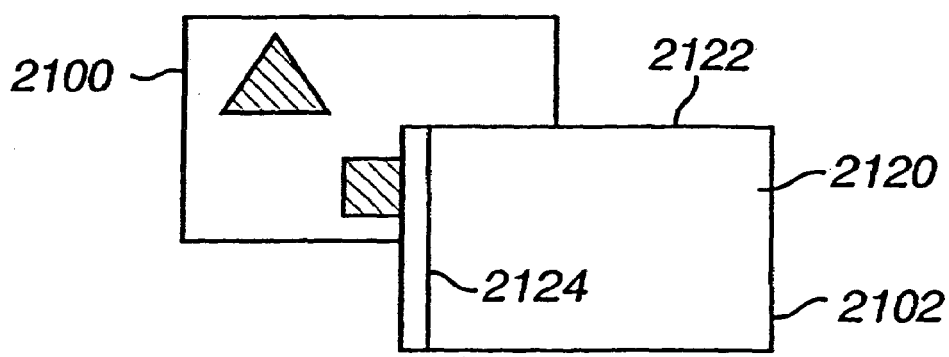

With reference to FIG. 11c, a refresh event occurs in relation to Window D, causing the opaque background 2120 and border 2122 of Window D 2102 to be redrawn, overwriting the overlying transparent Window C 2100. In addition, in the first drawing operation performed by the client (application), the first of the three vertical lines 2124 is drawn. It is noted that, in the present example, the window manager does not redraw the overlying window after drawing the 'system' areas of the window (the border and background, for example), but in variants of the preferred embodiment, such a redraw does take place before the client (application) is requested to redraw the 'user' areas.

Figure 11D:
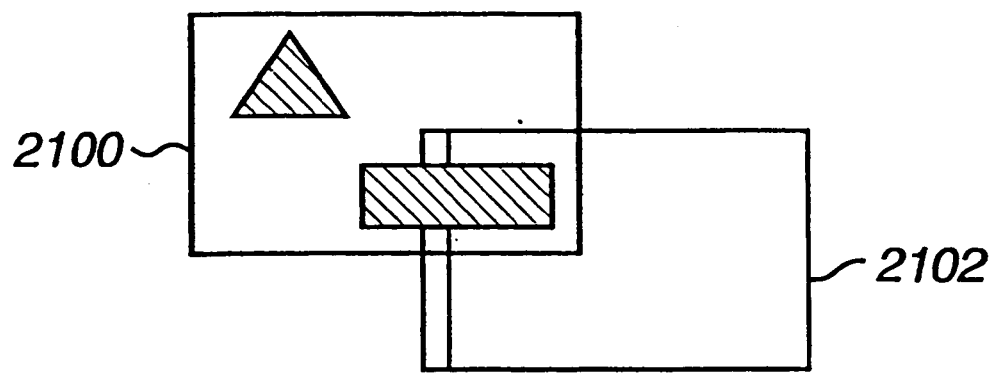
Figure 11E:
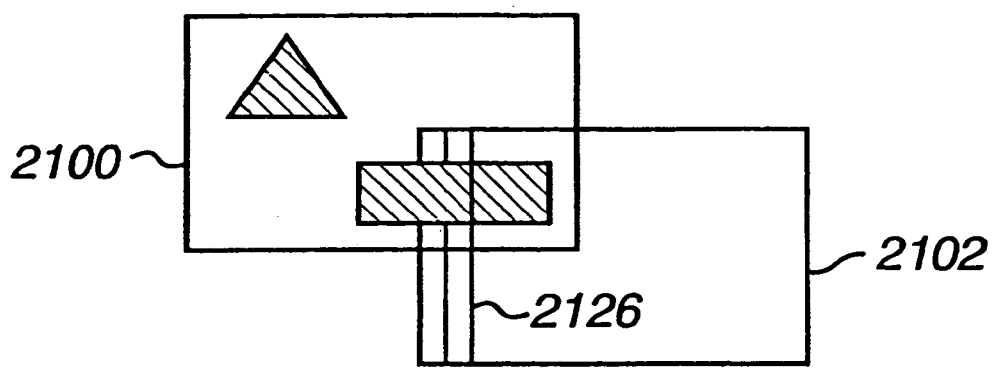
Figure 11F:
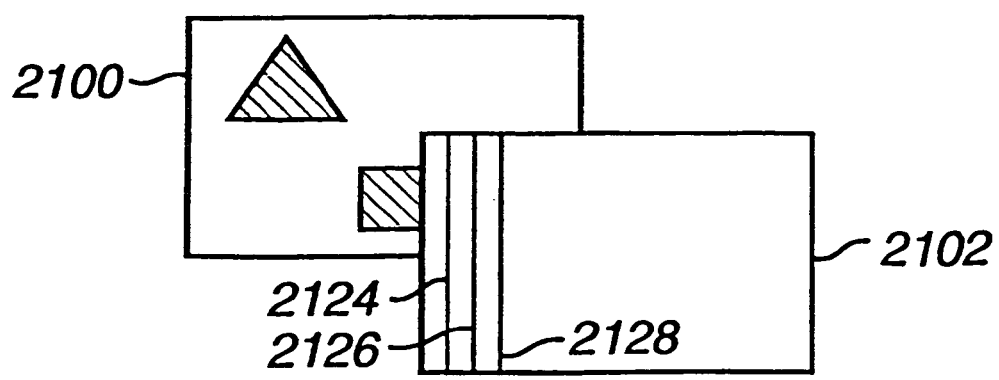

The simplest case, where overlying windows are redrawn after each subsequent drawing operation, is illustrated in FIGS. 11d and 11e. In FIG. 11d, the overlying Window C 2100 is redrawn, following the sending of an Expose event to that window. With reference to FIG. 11e, the next drawing operation then takes place, with the drawing of the vertical line 2126. As discussed above, in this case, the overlying window will eventually be redrawn three times in total, two more than are necessary.

In the case where the redrawing of the overlying window is deferred, as described above and with reference to FIG. 11f, all three vertical lines 2124, 2126, 2128 are drawn in Window D 2102 before the overlying Window C 2100 is redrawn, after which the windows have their correct appearance as illustrated in FIG. 11b.

A further example in which an object to be drawn requires ten draw commands will now be described, again highlighting the feature of deferred redrawing of overlying transparent windows. As before, the object is to be drawn in a environment containing transparent windows.

In accordance with the methods described above, one of two procedures may be chosen. The first procedure is as follows:
1. Set the win_over_mode parameter to Ignore No Background
2. Perform the ten drawing operations. No Expose Events are generated, since all transparent windows are ignored.
3. Set the win_over_mode parameter to Clip All
4. Draw a virtual rectangle which encompasses all areas which have been drawn in. This operation generates an Expose Event which is sent to the affected windows.

The second, shorter, procedure which may be chosen is as follows:
1. Set the no_bg_win_management attribute to LetMeDoIt
2. Perform the ten drawing operations. No Expose Events are generated, since all transparent windows are ignored.
3. Call SentEventToNoBgWindow( ), passing as a parameter the physical extent of the ten drawing operations. Expose Events are then sent to the affected windows.

It is noted that both procedures achieve the same result.

In the above example, rather than the affected windows being redrawn ten times, as would be the case if an Expose Event were generated for each draw command, the windows are only redrawn once. In this way, considerable savings in processing may be made.

In a variant of the preferred embodiment, a further method of redrawing windows is employed. This method comprises sending a signal to redraw overlying windows following a specific number of drawing operations, where the number is usually determined in advance of the drawing operations. With reference to the above example where a total of ten drawing operations were required, if the number chosen was 5, any overlying windows would be redrawn after the $5^{th}$ and $10^{th}$ drawing operations.

This method of redrawing offers the advantage of redrawing less frequently than if the redraw occurred after each drawing operation, but offers a further advantage of keeping the screen refreshed relatively frequently in the event of a large number of consecutive drawing operations being performed. The number of drawing operations to wait for before refreshing can be almost any number, from 1 upwards (but typically would be between 1 and 1000), depending on the current processor load, for example. The handling of the counting and redrawing may be handled either by the client or by the window manager.

Use of the optimizations described above with regard to the deferral of redrawing of transparent windows allows an application to use transparent windows with a considerable reduction in the amount of processing involved. This is of particular advantage in environments such as receiver/decoders where processing power may be limited.

Further advantages particular to receiver/decoders are also afforded. For example, the use of transparent windows can typically allow a smaller windowing display to be provided, since the windows can be stacked on top of each other more effectively. With the windowing display typically in use being overlaid on a video image (by the graphics processor described above, which takes inputs both from the video decoder and from the windowing system), a smaller windowing display is highly preferential since less of the video image would then be obscured.

Furthermore, the method of displaying transparent windows typically employed (in contrast to blending methods) can result in a higher contrast images when displayed on a television (which cannot generally support as high a resolution as a computer monitor, for example).

With reference to FIGS. 12 to 15, a further example will be described, concerning a particular application of the transparent windowing system described above: namely, an Internet browser application for a receiver/decoder.

Figure 12:
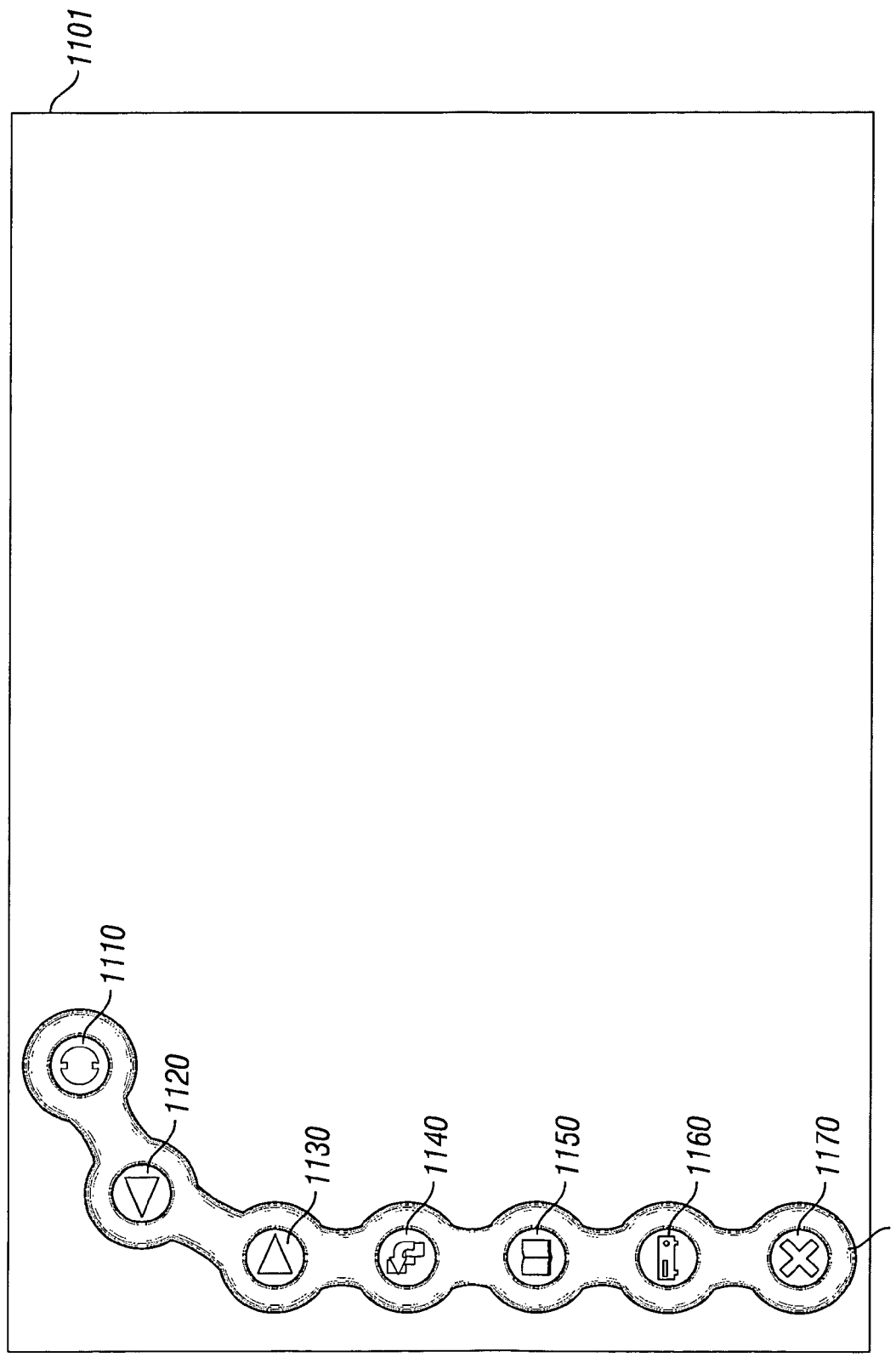
FIG. 12 illustrates a screen display of a web browser.

FIG. 12 shows a screenshot of the main screen navigator display of the Internet browser. The main screen shows a vertical chain 1100 which includes the main menu which includes various buttons as a linked list. The buttons are linked by link elements of the chain. The buttons shown in the chain 1100 of FIG. 12 include the RELOAD/STOP button 1110, the PREVIOUS button 1120, NEXT button 1130, HISTORY button 1140, BOOKMARK button 1150, SETTINGS button 1160 and the QUIT button 1170.

The main menu chain 1100 is arranged to be superimposed on the hyper-text markup language (HTML) document to be displayed on the screen 1101. In FIG. 12, no HTML document is displayed and the screen 1101 is blank apart from the main menu chain 1100.

The user has a controller with which he can navigate between objects on the screen 1101, highlight objects and select objects. In the present example, the controller used is a television remote control. When an HTML page is displayed, any button of the remote control calls the chain 1100 (toolbar). The chain 1100 can also be turned on and off by the user.

Figure 13:
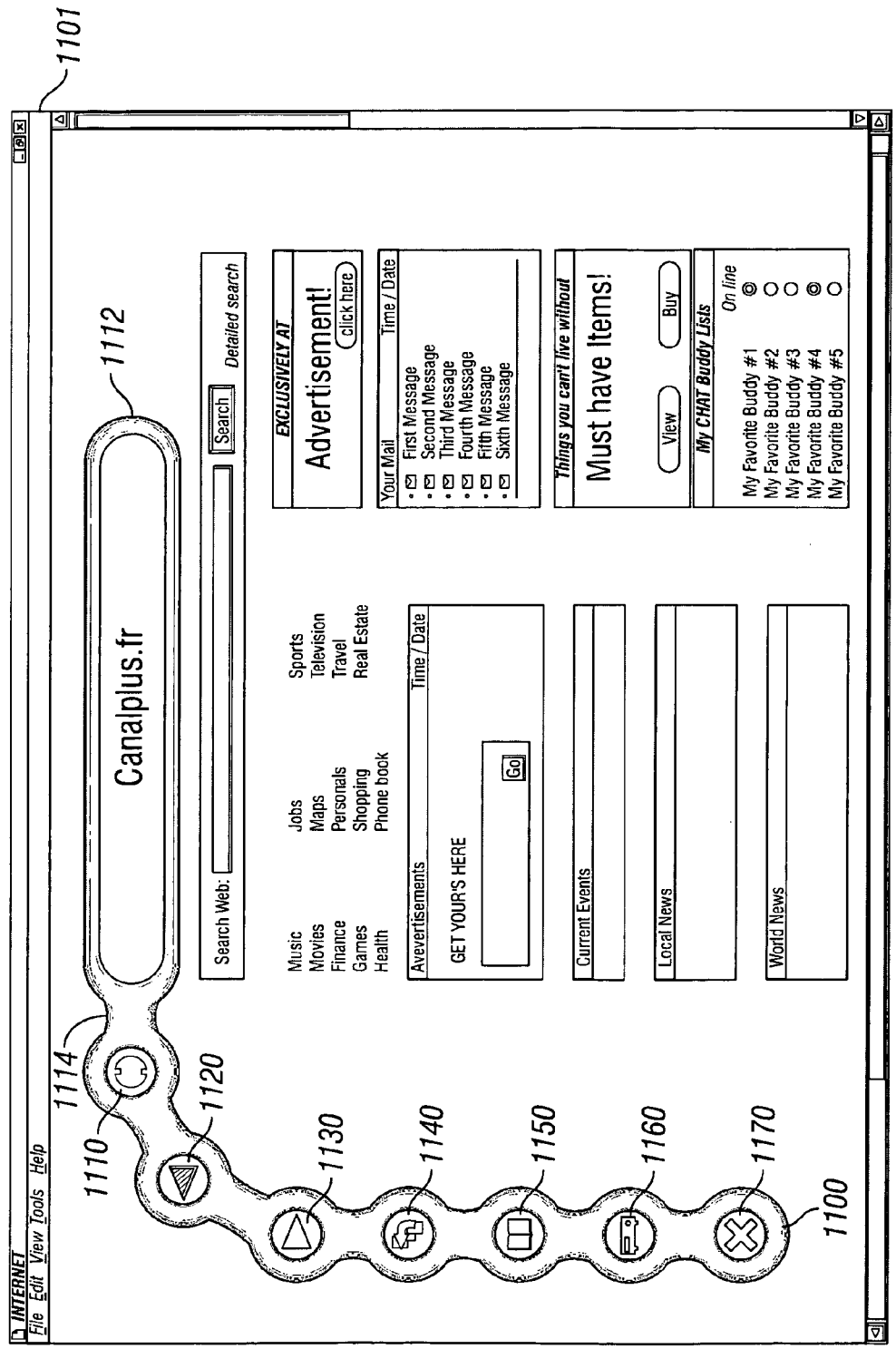
FIG. 13 illustrates a further screen display of the web browser.

FIG. 13 shows the screen of FIG. 12 having an HTML document open. In FIG. 13, the PREVIOUS button 1120 is now highlighted.

Figure 14:
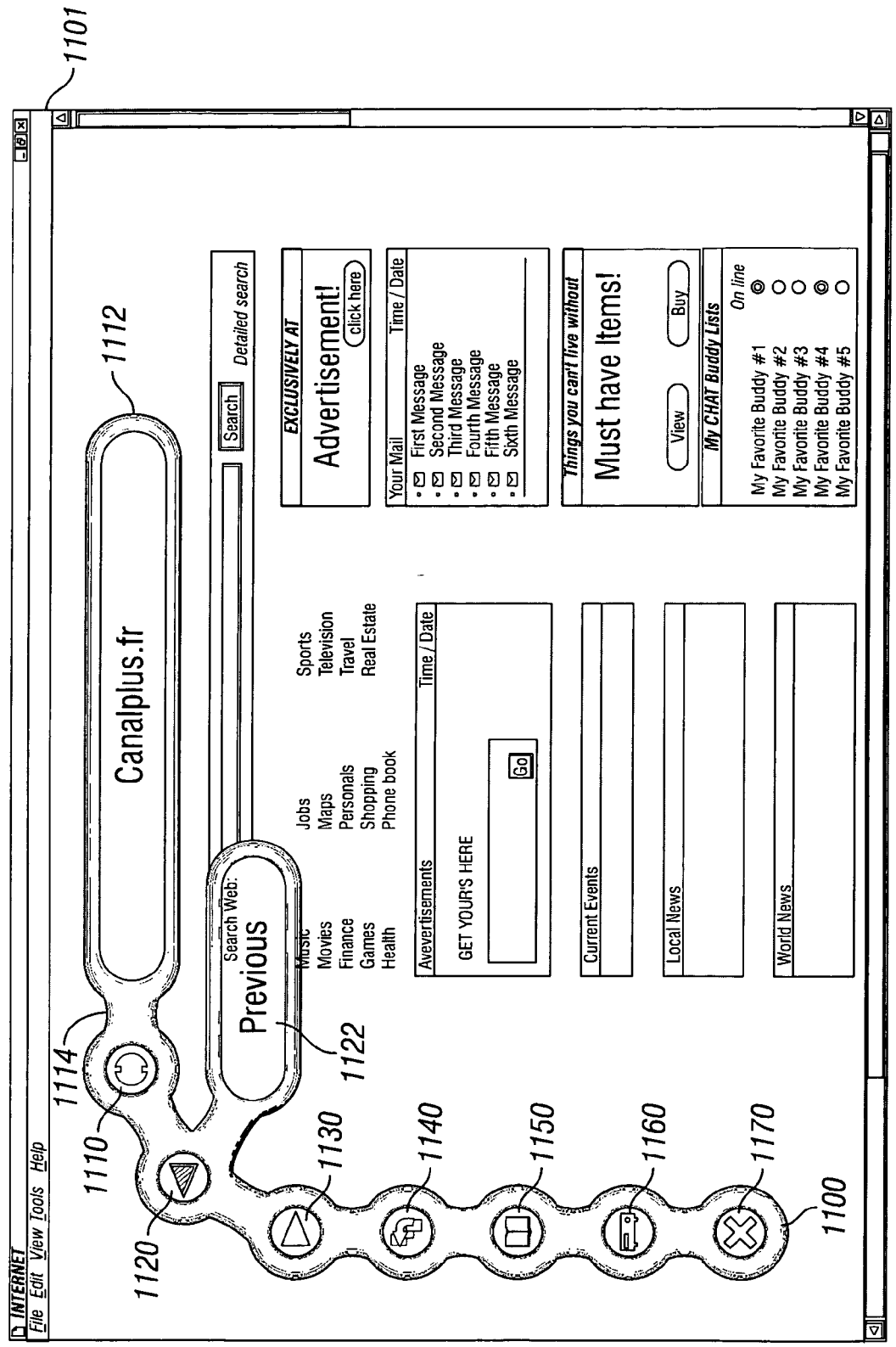
FIG. 14 illustrates a further screen display of the web browser.

FIG. 14 shows how, when the highlight is on the PREVIOUS button 1120 a "tooltip" comprising a text box 1122 appears on the screen. In the present example, the tooltip appears as soon as the relevant icon is highlighted. The preferences could be set so that the tooltip appears after a delay when the button is highlighted. The text box 1122 includes the word "previous" to indicate the function of the PREVIOUS button 1120. By activating the PREVIOUS button, by pressing the SELECT key 1186, the browser moves to the previous page viewed.

A "widget set", used to draw the above navigation chain (amongst other things) will now be described, before returning to the discussion of FIGS. 12 to 14. One particular application of such a widget set is to provide widgets in a GUI display of a receiver/decoder for digital television. Amongst other things, the widget set contains a set of primitive widget classes 410 including, amongst others, window and dialogue box frames, a slider control, a push button, a check box, a text field, and a text editing box.

Each of the widget classes implements methods and event handlers to control operation of the widget. The widget classes may also contain methods for drawing some parts of the widget. However, in order to provide a particular appearance or "look" for the widget, the widget classes invoke drawing methods of a look object class with which the widget class is associated.

A look includes, amongst other things, a definition of colours, so that any widget instance which is associated with a particular look instance will use the colours defined in that look instance. In one embodiment, a look defines several colours, such as black, dark gray, middle gray, light gray, very light gray, white, and highlight colour. Significantly, and in addition, it also defines a transparent colour.

Figure 15:
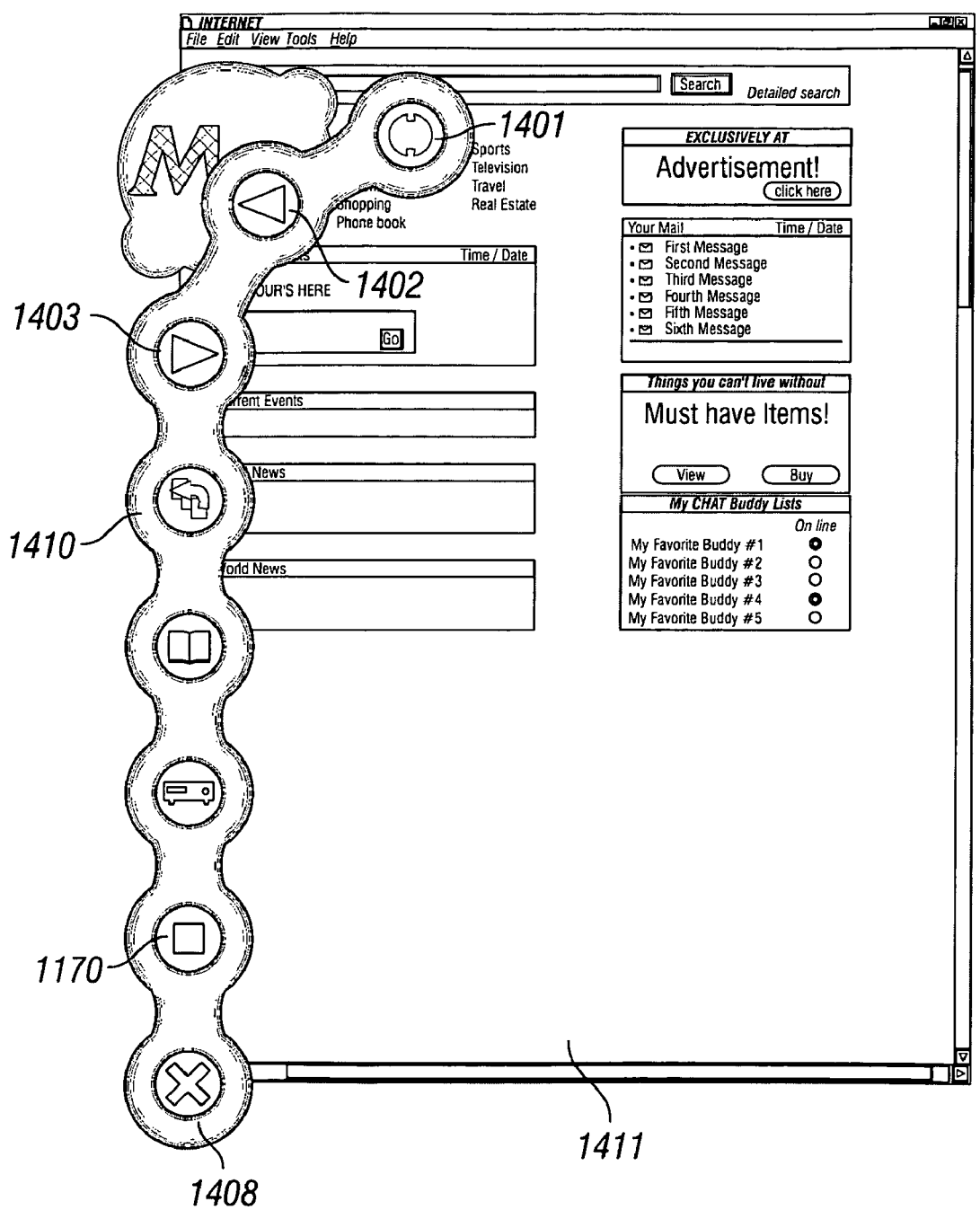
FIG. 15 illustrates a further screen display of the web browser.

FIG. 15 shows in more detail the top-level chain of navigator function buttons (1410) described above, with a portion of a web page visible beneath (1411).

As mentioned previously, the main screen displays a vertical bar (main menu) (1410) which is composed of a series of buttons. A button is effectively a rectangular or square zone (for example, 32×32 pixels). When the graphics cursor enters a zone, that zone (window) receives the focus.

In the light of the above, one can summarize that each zone is a window, and, as is observed from FIG. 15, the background of each of these windows is arranged to be transparent, consequently allowing each button of the toolbar (comprising an interactive foreground object) to have an apparently non-rectangular shape when overlaid on the Internet browser. Apart from allowing the designer of the Internet browser more flexibility, this can allow a more compact arrangement of the buttons with consequent advantages.

The structure and function of the above Internet browser and navigation toolbar are discussed in more detail in European Patent Application No. 00300832.3 in the name of Canal+ Technologies Societe Anonyme.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of drawing in a window, the method comprising providing a first mode in which a signal is sent to a client of an affected window after the completion of every specific number of more than one drawing operation instructing the client of the affected window to redraw at least part of the affected window, and providing a second mode in which the sending of a signal is suppressed.

2. The method according to claim 1, wherein the signal is sent from a window manager.

3. The method according to claim 1, wherein the signal is sent from a client of the window, and is sent by the client which carried out the drawing, and sent to a window manager.

4. The method according to claim 2, further comprising making information relating to the transparency of the window available to the window manager.

5. The method according to claim 4, further comprising storing the information as an attribute of the window.

6. The method according to claim 4, wherein the sending of a signal is suppressed in dependence on the information.

7. The method according to claim 1, further comprising the steps of:
defining the size of the window;
drawing foreground objects in the window; and
arranging the background of the window, and further comprising displaying a further window which has a background through which underlying objects are visible, wherein at least a part of the window underlies the further window.

8. The receiver/decoder according to claim 7, further comprising means for displaying a further window, which has a background through which underlying objects are visible.

9. The receiver/decoder according to claim 7, further comprising means for monitoring drawing in a further window so that drawing in the further window affecting said window can be corrected.

10. The receiver/decoder according to claim 7, further comprising:
means for defining a size of the window;
means for drawing foreground objects in the window;
means for arranging the background of the window, and further comprising means for displaying a further window which has a background through which underlying objects are visible, wherein at least part of the first window underlies the further window.

11. A receiver/decoder comprising means for drawing in a window, in first and second modes, wherein in the first mode a signal is sent to a client of an affected window after the completion of every specific number of more than one drawing operation instructing the client of the affected window to redraw at least part of that window, and in the second mode the sending of a signal is suppressed.

12. The receiver/decoder according to claim 11, wherein the signal is sent from a window manager.

13. The receiver/decoder according to claim 12, further comprising means for making information relating to the transparency of the window available to the window manager.

14. The receiver/decoder according to claim 13, further comprising means for storing the information as an attribute of the window.

15. The receiver/decoder according to claim 13, wherein the sending of a signal is suppressed in dependence on the information.

16. The receiver/decoder according to claim 11, wherein the signal is sent from a client of a window, and is sent by the client which carried out the drawing, and is sent to a window manager.

17. A method of displaying a window on a screen, wherein the window has a background through which underlying objects are visible, the method comprising:
determining whether an area underlying the window has changed and, if so, redrawing at least one part of the window, after receiving a signal instructing a client of the window to redraw the at least one part of the window, the method being carried out by a receiver/decoder, the receiver/decoder being for use with a television set;
identifying an area of the window affected by the change in the area underlying said window;
identifying foreground objects in the affected area; and
redrawing at least one part of the foreground objects in the affected area after receiving a signal instructing the client of the window to redraw at least part of the affected window.

18. The method according to claim 17, wherein after said redrawing step, said foreground objects obscure, at least in part, the area underlying the foreground objects.

19. The method according to claim 17, further comprising displaying a further window, which has a background through which underlying objects are visible.

20. The method according to claim 19, wherein at least part of the first window underlies the further window.

21. The method according to claim 17, further comprising monitoring drawing in a further window so that drawing in the further window affecting said window can be corrected.

22. A method of displaying a window on a screen, wherein the window has foreground objects and a background through which underlying objects are visible, the method including:
determining that an area underlying the window has changed,
identifying an area of the window affected by the change,
identifying foreground objects in the affected area, and
redrawing at least the part of the foreground objects in the affected area after receiving a signal instructing a client of the window which may be affected to redraw at least part of that window,
the method being carried out by a receiver/decoder, the receiver/decoder being for use with a television set.

23. The method according to claim 22, wherein after said redrawing step, said foreground objects obscure, at least in part, the area underlying the foreground objects.

24. A method of drawing in a window, the method comprising:
drawing in the window and monitoring the drawing;
determining a window which may be affected by the drawing; and
sending a signal instructing a client of the window which may be affected to redraw at least part of that window so that drawing affecting an overlaying window can be corrected, wherein the signal is sent to the client of the affected window after the completion of every specific number of more than one drawing operation,
the method being carried out by a receiver/decoder.

25. The method according to claim 24, further comprising suppressing the signal for at least one drawing operation.

26. A receiver/decoder comprising means for displaying a window on a screen, wherein the window has a background through which underlying objects are visible, further comprising:
means for determining whether an area underlying the window has changed;
means for redrawing at least part of the window, if an area underlying the window has changed, after receiving a signal instructing a client of the window which may be affected to redraw at least part of that window;
the receiver/decoder being for use with a television set;
means for identifying an area of the window affected by the change in the area underlying said window;
means for identifying foreground objects in the affected area; and
means for redrawing at least part of the foreground objects in the affected area after receiving a signal instructing a client of the window which may be affected to redraw at least part of that window.

27. The receiver/decoder according to claim 26, wherein as a result of the operation of said redrawing means, said foreground objects obscure, at least in part, the area underlying the foreground objects.

28. The receiver/decoder according to claim 27, wherein at least a part of the first window underlies the further window.

29. A receiver/decoder comprising means for displaying a window on a screen wherein the window has foreground objects and a background through which underlying objects are visible, and further comprising:
- means for determining that an area underlying the window has changed;
- means for identifying an area of the window affected by the change;
- means for identifying foreground objects in the affected area; and
- means for redrawing at least the part of the foreground objects in the affected area after receiving a signal instructing a client of the window which may be affected to redraw at least part of that window.

30. A receiver/decoder comprising means for drawing in a window, and further comprising:
- means for drawing in the window and for monitoring the drawing;
- means for determining a window which may be affected by the drawing, and for sending a signal instructing a client of the window which may be affected to redraw at least part of that window so that drawing affecting an overlaying window can be corrected, wherein the signal is sent following each drawing operation.

31. The receiver/decoder according to claim 30, further comprising means for suppressing the signal for at one drawing operation.

* * * * *